United States Patent [19]

Carey, II et al.

[11] Patent Number: 5,695,822

[45] Date of Patent: Dec. 9, 1997

[54] METHOD FOR COATING A METAL STRIP

[75] Inventors: Jay F. Carey, II, Follansbee, W. Va.; Mehrooz Zamanzadeh, Pittsburgh, Pa.

[73] Assignee: The Louis Berkman Company, Steubenville, Ohio

[21] Appl. No.: 604,078

[22] Filed: Feb. 20, 1996

Related U.S. Application Data

[60] Division of Ser. No. 438,042, May 8, 1995, Pat. No. 5,597,656, which is a continuation-in-part of Ser. No. 338,386, Nov. 14, 1994, Pat. No. 5,470,667, which is a continuation of Ser. No. 175,523, Dec. 30, 1993, Pat. No. 5,401,586, which is a continuation-in-part of Ser. No. 154,376, Nov. 17, 1993, abandoned, which is a continuation of Ser. No. 42,649, Apr. 5, 1993, abandoned.

[51] Int. Cl.$^6$ ............................ B05D 3/00
[52] U.S. Cl. .............. 427/329; 427/331; 427/406; 427/433; 427/436
[58] Field of Search ............. 427/329, 331, 427/406, 433, 436

[56] References Cited

U.S. PATENT DOCUMENTS

| | | | |
|---|---|---|---|
| 84,205 | 11/1868 | Mills | 428/648 |
| 169,810 | 3/1875 | Holden . | |
| 347,928 | 8/1886 | Farmer . | |
| 616,613 | 12/1898 | Griffith | 420/557 |
| 1,156,169 | 10/1915 | Monnot . | |

(List continued on next page.)

FOREIGN PATENT DOCUMENTS

| | | | |
|---|---|---|---|
| 674003 | 12/1963 | Canada . | |
| 0012437 | 6/1979 | European Pat. Off. | B05D 1/36 |
| 0261078 | 9/1987 | European Pat. Off. | C23C 2/00 |
| 0269006 | 11/1987 | European Pat. Off. | C23C 2/06 |
| 480122 | 4/1992 | European Pat. Off. . | |

OTHER PUBLICATIONS

Van Nostrand's Scientific Encyclopedia, 6th Edition, vol. 1, 1983; pp. 94–96—Definition of "Alloys"; p. 1322—Definition of Galvanizing.

Van Nostrand's Scientific Encyclopedia, 6th Edition, vol. 11, 1983, pp. 2832–2834—Definition of "Tin"; pp. 3059–3062—Definition of Zinc.

McGraw–Hill Encyclopedia of Science & Technology, 6th Edition, 1987, p. 517.

McGraw–Hill Encyclopedia of Science & Technology, 6th Edition, 1987, pp. 35–37; 44–46.

McGraw–Hill Encyclopedia of Science & Technology, 6th Edition, 1987, pp. 368–372.

McGraw–Hill Encyclopedia of Science & Technology, 6th Edition, 1987, pp. 618–623.

Abstract of Great Britain Patent 2,055,158 Aug. 1983.

English Translation of Kokai Patent Application No. SHO–49(1974) 54230.

Soldering Manual; American Welding Society; 1959; pp. 21–23.

The Making, Shaping and Treating of Steel U.S. Steel Corporation, 1957, pp. 655–659.

Constitution of Binary Alloys; McGraw–Hill Book Company; 1958; pp. 1217–1219.

Higuchi, et al, "Sn–Zn Alloy Electroplated Steel Sheet for Container for Alcohol Fuel or Alcohol–Containing Fuel", Translation of Kokai 58/48690 1983, 11 pages.

Federal Specification QQ–T–201F, 12 Nov. 1986, "Terne Plate, for Roofing and Roofing Products" pp. 1–8.

Hot Dip Tin Coating of Steel and Cast Iron, Metals Handbook, 9th Ed., vol. 5, 1983, pp. 351–355.

*Primary Examiner*—Benjamin Utech
*Attorney, Agent, or Firm*—Vickers, Daniels & Young

[57] ABSTRACT

A corrosion-resistant metal strip and method for making the same which is essentially lead free and is not highly reflective. The coating on the metal strip is a two-phase metallic coating comprised of tin and zinc and a very low weight percentage of lead. The coating alloy may also include antimony, bismuth and copper to improve the coating process and/or improve the properties of the tin and zinc coating. A metal layer may also applied to the surface of the metal strip prior to applying the metallic alloy coating.

70 Claims, 2 Drawing Sheets

U.S. PATENT DOCUMENTS

| | | | |
|---|---|---|---|
| 1,989,925 | 2/1935 | Hoover | 148/6 |
| 2,069,658 | 2/1937 | Renkin | 91/70.2 |
| 2,210,593 | 11/1940 | McCullough | 75/175 |
| 2,233,578 | 3/1941 | Boak | 420/514 |
| 2,258,327 | 10/1941 | Kramer | 29/181 |
| 2,374,926 | 5/1945 | Fink | 117/51 |
| 2,472,402 | 6/1949 | Boyle | 75/178 |
| 2,533,048 | 12/1950 | Rodgers | 117/52 |
| 2,703,766 | 3/1955 | Ellis | 117/114 |
| 2,806,622 | 9/1957 | Leirer | 220/5 |
| 2,863,766 | 12/1958 | Larkins | 420/524 |
| 2,864,733 | 12/1958 | Kranich | 148/24 |
| 2,884,350 | 4/1959 | Saubestre | 148/6.14 |
| 3,012,310 | 12/1961 | Godfrey | 29/196.4 |
| 3,058,856 | 10/1962 | Miller | 148/16 |
| 3,105,022 | 9/1963 | Boggs | 204/37 |
| 3,231,127 | 1/1966 | Virzi | 220/52 |
| 3,331,230 | 7/1967 | Bentz | 72/42 |
| 3,630,792 | 12/1971 | Smyth | 148/6.3 |
| 3,728,144 | 4/1973 | Poucke | 117/51 |
| 3,791,801 | 2/1974 | Ariga et al. | 29/196.5 |
| 3,860,438 | 1/1975 | Shoemaker | 117/50 |
| 3,962,501 | 6/1976 | Ohbu et al. | 427/433 |
| 3,966,564 | 6/1976 | Hyner et al. | 204/43 |
| 4,015,950 | 4/1977 | Galland et al. | 428/648 |
| 4,026,728 | 5/1977 | Yoshida et al. | 148/6.14 R |
| 4,049,481 | 9/1977 | Morisaki | 156/151 |
| 4,126,450 | 11/1978 | Lathrop et al. | 75/178 |
| 4,152,471 | 5/1979 | Schnedler et al. | 427/310 |
| 4,173,663 | 11/1979 | Bostroem | 427/211 |
| 4,177,326 | 12/1979 | Windal et al. | 428/645 |
| 4,184,928 | 1/1980 | Hoije | 204/43 |
| 4,190,504 | 2/1980 | Usui | 204/35 |
| 4,202,921 | 5/1980 | Enghag | 427/406 |
| 4,216,250 | 8/1980 | Nakayama et al. | 427/289 |
| 4,321,289 | 3/1982 | Bartsch | 427/287 |
| 4,330,574 | 5/1982 | Pierson et al. | 427/319 |
| 4,357,027 | 11/1982 | Zeitlow | 280/5 |
| 4,416,920 | 11/1983 | Pierson et al. | 427/349 |
| 4,451,541 | 5/1984 | Beal | 428/658 |
| 4,599,279 | 7/1986 | Mirra et al. | 428/658 |
| 4,758,407 | 7/1988 | Ballentine et al. | 420/560 |
| 4,778,733 | 10/1988 | Lubrano et al. | 428/647 |
| 4,806,309 | 2/1989 | Tulman | 420/562 |
| 4,814,049 | 3/1989 | Helton et al. | 204/44.2 |
| 4,862,825 | 9/1989 | Fontaine | 118/63 |
| 4,879,096 | 11/1989 | Naton | 420/561 |
| 4,883,723 | 11/1989 | Kilbane et al. | 428/653 |
| 4,934,120 | 6/1990 | Boyd | 52/52 |
| 4,969,980 | 11/1990 | Yoshioka et al. | 204/28 |
| 4,987,716 | 1/1991 | Boyd | 52/520 |
| 4,999,258 | 3/1991 | Wake et al. | 428/632 |
| 5,023,113 | 6/1991 | Boston et al. | 427/320 |
| 5,053,112 | 10/1991 | Jones et al. | 304/38.5 |
| 5,114,799 | 5/1992 | Wake et al. | 428/632 |
| 5,134,039 | 7/1992 | Alexander et al. | 428/614 |
| 5,175,026 | 12/1992 | Bertol et al. | 427/307 |
| 5,202,002 | 4/1993 | Tsuchinaga et al. | 204/145 |
| 5,203,985 | 4/1993 | Nishimura et al. | 205/193 |
| 5,314,758 | 5/1994 | Carey, II et al. | 428/648 |
| 5,354,624 | 10/1994 | Carey, II | 428/647 |
| 5,395,702 | 3/1995 | Carey, II et al. | 428/624 |
| 5,395,703 | 3/1995 | Carey, II et al. | 428/648 |
| 5,397,652 | 3/1995 | Carey, II et al. | 428/610 |
| 5,401,586 | 3/1995 | Carey, II et al. | 428/659 |
| 5,429,882 | 7/1995 | Carey, II et al. | 428/647 |
| 5,433,839 | 7/1995 | Amelot et al. | 205/154 |
| 5,470,667 | 11/1995 | Carey, II et al. | 428/659 |
| 5,480,731 | 1/1996 | Carey, II et al. | 428/648 |
| 5,489,490 | 2/1996 | Carey, II et al. | 428/647 |
| 5,491,035 | 2/1996 | Carey, II et al. | 428/647 |
| 5,491,036 | 2/1996 | Carey, II et al. | 428/647 |
| 5,492,772 | 2/1996 | Carey, II et al. | 428/648 |
| 5,492,776 | 2/1996 | Paz-Pujalt et al. | 428/696 |
| 5,520,964 | 5/1996 | Carey, II et al. | 427/431 |

FOREIGN PATENT DOCUMENTS

| | | | |
|---|---|---|---|
| 746337 | 5/1933 | France . | |
| 1457769 | 9/1966 | France . | |
| 2052324 | 3/1971 | France . | |
| 2281995 | 8/1974 | France . | |
| 2554831 | 11/1983 | France . | |
| 2554831 | 5/1985 | France . | |
| 2713196 | 10/1978 | Germany . | |
| 4309500 | 9/1993 | Germany . | |
| 51-42031 | 4/1976 | Japan . | |
| 56-69340 | 6/1981 | Japan . | |
| 58-48694 | 3/1983 | Japan . | |
| 59-41430 | 3/1984 | Japan . | |
| 59-96238 | 6/1984 | Japan . | |
| 59-200795 | 11/1984 | Japan . | |
| 2-243793 | 9/1990 | Japan . | |
| 2813 | of 1857 | United Kingdom . | |
| 244523 | 12/1925 | United Kingdom . | |
| 528558 | 10/1932 | United Kingdom . | |
| 581604 | 10/1946 | United Kingdom . | |
| 626826 | 7/1949 | United Kingdom . | |
| 642122 | 8/1950 | United Kingdom . | |
| 707765 | 4/1954 | United Kingdom . | |
| 709163 | 5/1954 | United Kingdom . | |
| 786651 | 11/1957 | United Kingdom . | |
| 796128 | 6/1958 | United Kingdom . | |
| 927530 | 5/1963 | United Kingdom . | |
| 1008316 | 10/1965 | United Kingdom . | |
| 1040916 | 9/1966 | United Kingdom | C23C 1/00 |
| 1074852 | 7/1967 | United Kingdom | H01N 1/02 |
| 1143107 | 2/1969 | United Kingdom | C22C 11/00 |
| 1178816 | 1/1970 | United Kingdom | C23C 1/04 |
| 1194751 | 6/1970 | United Kingdom . | |
| 1277523 | 6/1972 | United Kingdom | C23C 1/04 |
| 1361942 | 7/1974 | United Kingdom | C23C 1/04 |
| 1419534 | 12/1975 | United Kingdom | C21D 1/26 |
| 1439774 | 6/1976 | United Kingdom | B65D 87/12 |
| 1448662 | 9/1976 | United Kingdom | C23C 1/04 |
| 1513002 | 6/1978 | United Kingdom . | |
| 1517454 | 7/1978 | United Kingdom . | |
| 2005307 | 4/1979 | United Kingdom . | |
| 2055158 | 2/1981 | United Kingdom | F16C 33/14 |
| 2055402 | 3/1981 | United Kingdom | B22F 7/00 |
| 1588808 | 4/1981 | United Kingdom . | |
| 2099857 | 1/1982 | United Kingdom . | |
| 2087931 | 6/1982 | United Kingdom | C23C 1/00 |
| 2117414 | 10/1983 | United Kingdom . | |
| 2242696 | 10/1991 | United Kingdom | E04D 1/12 |
| 2265389 | 9/1993 | United Kingdom . | |
| 2276887 | 10/1994 | United Kingdom . | |

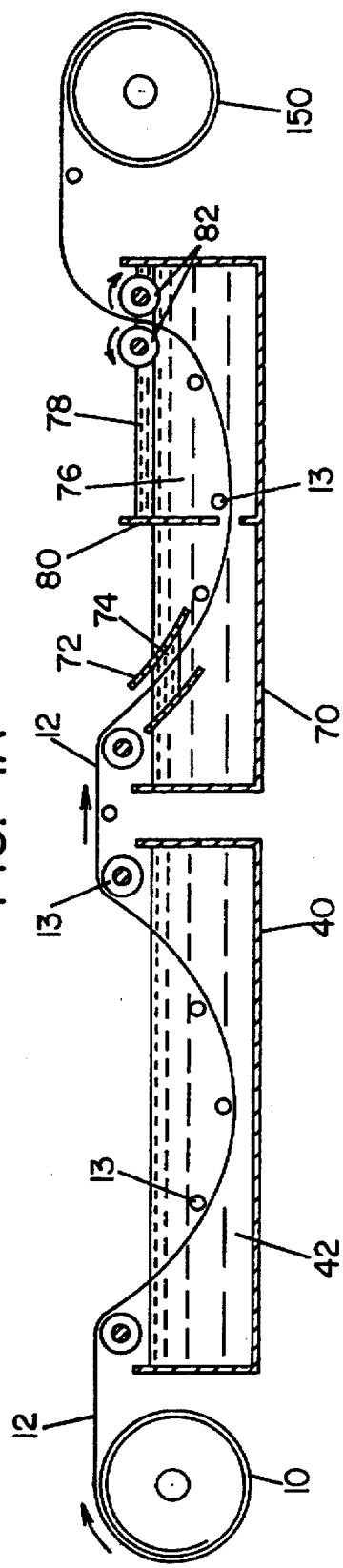
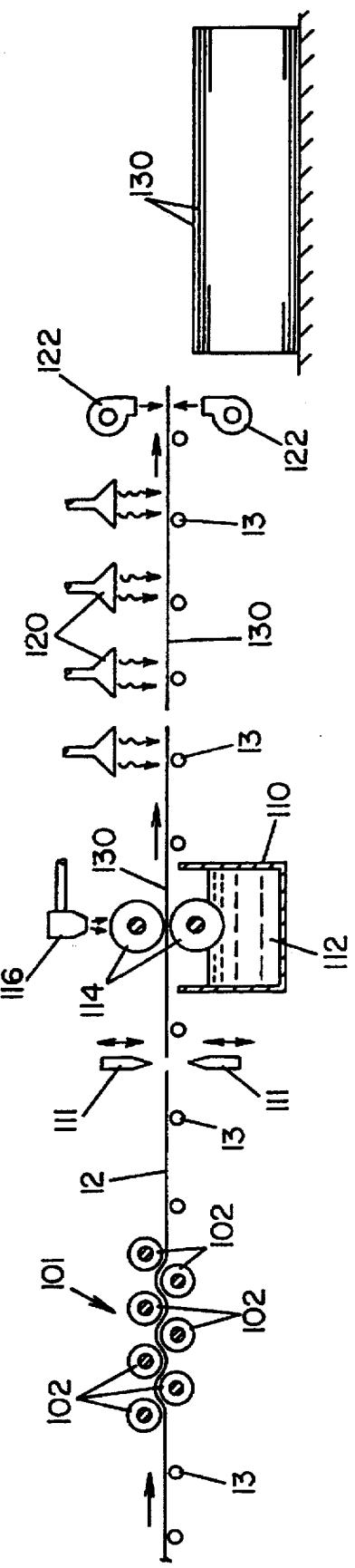
FIG. 1A
FIG. 1B

METHOD FOR COATING A METAL STRIP

This application is a divisional of U.S. patent application Ser. No. 08/438,042, filed May 8, 1995, now U.S. Pat. No. 5,597,656 which in turn is a continuation-in-part of U.S. patent application Ser. No. 08/338,386, filed Nov. 14, 1994, now U.S. Pat. No. 5,470,667 which in turn is a continuation of U.S. patent application Ser. No. 08/175,523, filed Dec. 30, 1993, now U.S. Pat. No. 5,401,586 which in turn is a continuation-in-part of abandoned application Ser. No 08/154,376 filed Nov. 17, 1993 which in turn is a continuation of abandoned application Ser. No. 042,649 filed Apr. 5, 1993.

The present invention relates to the art of coated metal strip and more particularly to a metal strip coated with a hot dip environmentally friendly alloy coating which provides long life to the metal strip.

INCORPORATED BY REFERENCE

As background material so that the specification need not specify in detail what is known in the art, Federal Specification No. QQ-T-201F and an article entitled "The Making, Shaping and Treating of Steel", U.S. Steel Corporation, 1957, pp. 655–659, Sci. Lib. Coll No. TN T30 C16, 1957 are incorporated herein by reference. Assignee's U.S. Pat. Nos. 4,987,716 and 4,934,120 are incorporated herein by reference to illustrate metal roofing systems of the type to which this invention can be used. U.S. Pat. No. 5,455,122 is incorporated herein by reference to illustrate petroleum receptacles of the type to which this invention can be used. U.S. Pat. No. 5,203,985 is incorporated herein by reference to illustrate a prior art electroplating process for the plating of nickel on a carbon steel strip. Assignee's U.S. Pat. Nos. 5,395,702; 5,397,652 and 5,455,122 are incorporated herein by reference to illustrate the process for coating tin containing alloys onto metal strip and subsequent processes for treating the coating metal strip. Assignee's U.S. Pat. Nos. 5,314,758; 5,354,624; 5,395,702; 5,395,703; 5,397,652; 5,401,586; 5,429,882 and 5,489,490 are incorporated herein by reference to illustrate various types of tin containing alloy compositions which can be used in the present invention.

BACKGROUND OF THE INVENTION

The present invention relates to the art of coated metal strip such as strip used for architectural materials, gasoline tanks and filter housings; however, the invention has broad applications and relates to various coating alloy compositions based upon tin and zinc and several novel method concepts used therein such as continuous hot dipping and applying an intermediate metal layer prior to hot dip coating. This invention is particularly applicable to the coating of thin stainless steel strip by applying an ultra thin layer of a metal, such as nickel, onto the strip as the strip is continuously progressing toward a molten bath of tin and zinc coating metal which is substantially free of lead, wherein the strip is hot dip coated to form an intermetallic layer and the invention be described with reference to the use; however, the invention has broader applications and can be used by applying an ultra thin intermediate layer of other metal, particularly tin, chromium, nickel and copper prior to hot dip coating.

Over the years, architectural materials, such as metal roofing systems and metal siding systems, made of pliable metals in various sheet gauge thicknesses have been used. Metals such as carbon steel, stainless steel, copper and aluminum are the most popular types of metal used for such architectural materials. The term "stainless steel" is used in the technical sense and includes the use of chromium, plated or alloyed, with a ferrous base.

Carbon steel architectural metal materials were commonly treated with corrosion-resistant coatings to prevent rapid oxidation of the metal surface, thereby extending the life of the materials. A popular corrosion-resistant coating for carbon steel is a terne coating. Terne coating of stainless steel and copper is also produce, but is much less prevalent than carbon steel due to the natural corrosion-resistant properties of stainless steel and copper. Terne coating has been the predominate and the most popular coating for carbon steel materials due to its relatively low cost, ease of application, corrosion-resistant properties and desirable colorization during weathering. Terne coated carbon steel is used for gasoline tanks, roofing and building materials and for various other products.

When the terne coated steel sheets are assembled into a roof covering, adjacent sheet edges are folded over one another to form a seam, typically a standing seam, and the seam is usually soldered vis-a-vis the terne coating to produce a waterproof joint. Today, the terne coated steel sheets can either be preformed or be formed at the job site onto roofing pans with bent edges which abut edges of adjacent pans which are then pressed or rolled into the seam. Similarly, caps, cleats, etc. are likewise formed from the terne coated sheet. In addition to providing for soldering of the seams, the terne coating inhibits rusting or oxidation of the metal sheet which would otherwise occur over time.

Terne or terne alloy is a term commonly used to describe an alloy containing about 80% lead and the remainder tin. The terne alloy is conventionally applied to the metals by a hot dip process wherein the metal strip is immersed into a molten bath of terne metal by a continuous or batch process. The terne coating inhibits the formation of ferrous oxide on the metal thus preventing corrosion and extending the life of the coated metal. The corrosion resistant properties of the terne alloy are primarily due to the stability of elemental lead and tin and the lead-tin oxide which forms from atmospheric exposure.

Although terne coated metals have excellent corrosion-resistant properties and have been used in various applications, terne coated materials have recently been questioned due to environmental concerns. Terne coated metals contain a very high percentage of lead. Although the lead in terne alloys is stabilized, there is concern about leaching of the lead from the terne alloy. Environmental and public safety laws have been recently proposed and/or passed prohibiting or penalizing the user of materials containing Lead. Because the terne alloy contains a very high percentage of lead, materials coated with terne have been prohibited in various types of usages or applications such as aquifer roofing systems. The concern of lead possibly leaching from the terne coating has made such coated materials inadequate and/or undesirable for several types of building and manufacturing applications. When terne is used in the automotive field, such as gasoline tanks, the components are eventually scrapped and the terne coated parts are discarded into land fills. The discarding of such parts has raised recent environmental concerns especially with respect to underground water sources. Consequently, terne coated automotive parts are in the process of being replaced. The prevailing wisdom in the business has concluded that there is no viable coated steel substitute for terne coated parts. Consequently, gasoline tanks and various other parts are being designed as plastic with all of the associated economical and environmental problems associated with plastic materials.

Another disadvantage of terne coated materials is the softness of the terne layer. As noted, terne coated metal sheets are commonly formed into varying shapes. The machines that bend the metal sheets periodically damage the terne coating during bending process. The terne coating is susceptible to damage due to the abrasive nature of the forming machines.

The terne alloy has a further disadvantage in that the newly applied terne is very shiny and highly reflective. As a result, the highly reflective coating cannot be used on buildings or roofing systems such as at airports and military establishments. The terne coating eventually loses its highly reflective properties as the components within the terne coating are reduced (weathered); however, the desired amount of reduction takes approximately 1½ to 2 years when the terne coating is exposed to the atmosphere, thus requiring the terne metals to be stored over long periods of time prior to being used in these special areas. The storage time is significantly prolonged when the terne coated materials are stored in rolls and the rolls are protected from the atmosphere.

A tin coating electroplated on a carbon steel strip has been recently suggested for use for gasoline tanks and related automotive components; however, such a coating is expensive to manufacture and is not necessarily successful for a coated strip drawn into such uses.

Tin coating of carbon steel is a well-known process for use in the food industry. However, in the specialized art of architectural materials, a tin coating for architectural materials has not been used until just recently as disclosed in U.S. Pat. No. 5,314,758.

The most popular process for applying a tin coating to carbon steel for use in the food industry is an electrolysis process. In an electrolysis process, the coating thickness is very thin and typically ranges between $3.8 \times 10^{-4}$ to $20.7 \times 10^{-4}$ mm ($1.5 \times 10^{-5}$ to $8.15 \times 10^{-5}$ in.). Furthermore, the equipment and materials needed to properly electroplate the metal materials are very expensive and relatively complex to use. The expense of applying an electroplated tin coating and the limited obtainable thicknesses of the tin coating are a disadvantage for using such a process for building and roofing materials and in the automotive field. Such processes create an extremely thin layer with a network of small pinholes making the strip generally unacceptable. Such electroplated strip may have a base flash layer and/or a cover coating to overcome the pinhole problems inherent with an electroplating process.

After over a decade of attempting to develop a substitute for terne coated steel for gasoline tanks and related disposable components, the present solution has been to electroplate metals such as tin or tin and zinc. Such processes create an extremely thin layer with a network of small pinholes making the strip generally unacceptable. Before the research and development project of Applicants, the steel industry had no commercially acceptable process for producing a thin ferrous strip having a corrosion-resistant coating constituting an alloy which was essentially free of lead.

At this time, in 1995, the tin industry is still proposing and experimenting with electroplating of tin with protective layers because the process is believed to be the only way to continuously coat steel. Hot-dipping of tin has been generally ignored even though a hot-dip process for applying the tin coating may be used. It has been found that when the metal strip is not properly prepared, the coating is not properly applied to the materials and minute areas of discontinuity in the tin coating occur resulting in non-uniform corrosion protection. This is especially a problem when the tin is applied to stainless steel materials by a hot-dip process. Tin is not electroprotective to steel under oxidizing conditions. Consequently, discontinuities in the tin coating result in the corrosion of the exposed metal. Although the exposed stainless steel corrodes at a significantly slower rate than standard carbon steel, the stainless steel will eventually corrode especially in high corrosive environments, i.e. petroleum, receptacles, marine products.

Prior to Assignee's application Ser. No. 000,101, now abandoned the concept of coating stainless steel with a corrosive-resistant material had proven of limited success and coating stainless steel with tin by a hot-dip process had repeatedly been unsuccessful using conventional hot-dip processes as discussed above. Prior to Assignee's application Ser. No. 000,101, the only process which semi-successfully coated stainless steel with tin was the complex and expensive electroplating process. The thickness of the tin plate was limited to a very thin thickness of not more than $20.7 \times 10^{-4}$ mm ($8.15 \times 10^{-2}$ in.). The limited tin coating thickness resulting from electroplating limited the uses and life of the tin plated materials.

Tin coatings have the further disadvantage of having a highly-reflective surface. As a result, materials coated with a tin coating cannot be used in an environment where highly-reflective materials are undesirable until the coated materials are further treated (i.e. paint) or the tin is allowed time to oxidize.

Coating architectural materials and other metal strip with zinc metal, commonly known as galvanization, is another popular metal treatment to inhibit corrosion. Zinc is a highly desirable metal to coat architectural materials because of its relatively low cost, ease of application (i.e. hot-dip application) and corrosion resistance. Zinc is also electroprotective to steel under oxidizing conditions and prevents the exposed metal, due to discontinuities in the zinc coating, from rapidly corroding. This electrolytic protection extends away from the zinc coating over exposed metal surfaces for a sufficient distance to protect the exposed metal at cut edges, scratches, and other coating discontinuities.

With all of the advantages of using zinc, zinc coatings have several disadvantages that make it undesirable for many types of building applications and for automotive components. Although zinc coatings will bond to many types of metals, the formed bond is not strong and results in the zinc coating flaking off the building materials. Flaking of zinc or zinc oxide in a gasoline tank will clog the gasoline lines and filters. Further, when using fuel injection systems, the small particles of zinc or zinc oxide will disable the injectors. Such problems are unacceptable in the automotive field. Thus, galvanized strip is common, but, not used for gasoline tanks. Zinc does not bond well on standard stainless steel materials. Zinc does not form a uniform and/or thick coating in a hot-dip process for stainless steel. As a result, discontinuities of the coating are usually found on the stainless steel surface. Zinc is also a very rigid and brittle metal and tends to crack and/or flake off when the materials are formed on site, i.e. press fitting of roofing materials or when gasoline tank components are drawn. When zinc begins to oxidize, the zinc coating forms a white powdery texture (zinc oxide). The popular grey, earth tone color is not obtained from pure zinc coatings.

Electroplating a tin and zinc mixture onto a steel sheet is disclosed in Japanese Patent application No. 56-144738 filed Sep. 16, 1981. The Japanese patent application discloses the plating of a steel sheet with a tin and zinc mixture to form a coating of less than 20 microns thick. The Japanese patent application discloses that after plating pin holes exist in the coating and subject the coating to corrosion. The pin holes are a result of the crystalline layer of a tin and zinc mixture which slowly forms during the plating process. The charged tin and zinc atoms in combination with the atomic structure of the atoms and formed crystal structure of a tin and zinc mixture prevents a uniform coating from being formed on the plated steel sheet. Consequently, the crystalline depositions must be covered with a chromate or phosphoric acid to fill the pin holes and prevent immediate corrosion.

The electroplating of the tin and zinc mixture onto the plated articles does not form an intermetallic layer between the article and the plated tin-mixture. Only when high temperature levels are obtained to melt the tin and zinc does an intermetallic layer form. As discussed in Assignee's application Ser. No. 165,085, the molten tin in a tin coating alloy interweaves with the surface atoms of the coated article. This intermetallic layer forms a strong bond between the metal strip and the molten alloy. The intermetallic layer also has excellent corrosion-resistant properties. Because the Japanese Patent Application No. 56-144738 does not produce an intermetallic layer during electroplating, the Japanese patent application discloses that a preplated layer of nickel, tin or cobalt on the steel sheet surface is needed so that the plated tin and zinc mixture will adhere to the steel sheet. Such electroplating techniques, as disclosed in the Japanese patent application, cost a tremendous amount of time and money and do not produce a commercially successful product. The Japanese patent application creates a network of pinhole, as does any electroplating process; therefore, the strip, when drawn, creates large areas exposing the base metal. Thus, in the manufacture of gasoline tanks, steel would be exposed directly to the stored liquid fuel and rapidly corrode.

The coating of steel articles by a batch hot-dip process with a tin, zinc and aluminum mixture is disclosed in U.S. Pat. No. 3,962,501 issued Jun. 8, 1976. The '501 patent discloses that the tin, zinc and aluminum mixture resists oxidation and maintains a metallic luster. The '501 patent discloses that the coating is applied by immersing a steel article into the molten alloy bath and subsequently withdrawing the steel article. The '501 patent also discloses that a molten tin-zinc alloy bath containing 3–97% zinc is very susceptible to oxidation at the surface thus producing viscous oxides which causes severe problems with the batch hot dip process of immersing the steel articles into the molten alloy, hold the article in the molten alloy bath for a period of time and subsequently removing the steel article from the molten alloy. Further, while the steel article is in the molten alloy, a large amount of dross is produced which results in non-uniformity of the coating and the formation of pin holes. The '501 patent discloses that the addition of up to 25% aluminum to the tin and zinc mixture inhibits dross formation during immersion of the steel article, prevents Zn-Fe alloy formation and reduces the viscous oxide formation on the molten bath surface. The '501 patent does not suggest the coating of continuous metal strip, nor does it teach the use of a continuous hot dip coating process which resolves the viscous oxide problem and dross formation problem. The continuous hot-dip process of a strip material subjects all the surfaces of the strip to a uniform residence time in the molten alloy to produce a relatively uniform coating and coating thickness on the continuously moving strip. A batch process as disclosed in the '501 patent subjects the surface of the article to differing residence times in the molten alloy during immersion and removal of the article into the molten alloy. The only way to overcome the disadvantage of such a process is to hold the article in the molten metal for a prolong time as suggested by the '501 patent. This differing of residence time in the molten alloy produces differing coating thicknesses and coating properties on the coated article or dictates a long holding time in the metal. The '501 patent also discloses the formation of a highly reflective coating which cannot be used in many building applications.

The treatment of a steel sheet by plating tin and zinc is disclosed in U.S. Pat. No. 4,999,258. The '258 patent discloses a steel sheet plated with a layer of tin and subsequently applying a layer of zinc such that the ratio of the zinc to tin is 2–30%. The tin and zinc plated layers are then heated until the zinc alloys with the tin. The tin and zinc plated coatings are plated to form a very thin layer. The tin is applied at 0.2–1.0 $g/m^2$ and the zinc is applied at 0.01–0.3 $g/m^2$. Due to the very thin coating thickness, the flow heating of the tin and zinc plating layers only requires 2–5 seconds for tin-zinc alloying. The '258 patent also discloses that when less than 1% zinc is used, the beneficial effect of the zinc is null; however, when more than 30% zinc is used, the coating will rapidly corrode under adverse environments. The '258 patent also discloses that a nickel plated layer is preferably applied to the steel sheet prior to applying the tin and zinc plated layers to improve corrosion resistance. The heat treated tin-zinc layer can be further treated by passivating with a chromate treatment to further improve corrosion resistance. The '258 patent does not teach the use of a hot dip coating process, nor does it teach the use of a continuous hot dip coating process which resolves various process problems such as viscous oxide and dross formation. The '258 patent is limited to the producing of a very thin tin-zinc coating. The tin-zinc coating is not a homogeneous coating since the zinc diffuses into the tin during heating to form a strata of layers. Equilibrium of the tin and zinc concentrations is not obtained during the short heating process. Such a thin coating is also highly susceptible to tearing when the coated metal material is formed into products such as automotive products and roofing products.

A continuous process for electroplating a carbon steel strip is disclosed in U.S. Pat. No. 5,203,985. The '985 patent discloses that nickel is electroplated on a continuously moving strip of carbon steel. After the carbon steel has been nickel plated, the plated strip is hot dip coated with molten zinc. The '985 patent is absent any teachings concerning a two phase (binary) tin and zinc alloy and the advantages of using such a two phase (binary) coating. Prior to the present invention, a tin and zinc coating was applied to a metal surface primarily by an electroplating process. As discussed above, such plated tin and zinc coatings were commercially unacceptable.

Due to the various environmental concerns and problems associated with corrosion-resistant coatings applied to metal architectural materials and automotive products, there has been a demand for a coating which is easily and successfully applied to materials that protect the materials from corrosion, does not have a highly-reflective surface subsequent to application and is applied by an economical process.

SUMMARY OF THE INVENTION

The present invention relates to a product and method of producing a corrosion-resistant, environmentally friendly metal material. More specifically, the invention relates to the coating of metal strip with a coating having a low lead content, indeed being essentially lead free, and forms a corrosive-resistant barrier on the coated strip.

In accordance with the principal feature of the invention, there is provided a metal strip of stainless steel, carbon steel or copper coated with a corrosion-resistant metal alloy. The metal coating alloy is an alloy primarily including tin and zinc for a two-phase (binary) alloy system. Other metal strip compositions which have been coated include metal strip made of nickel alloys, aluminum, titanium and bronze. "Stainless steel" in the application is used in its technical sense and includes a large variety of alloy metals containing chromium and iron. Chromium plated ferrous materials are also stainless steel. During hot-dipping, the plated chromium softens and intermingles with the ferrous strip to form a ferrous-chromium alloy. The stainless steel may also contain other elements such as nickel, carbon, molybdenum, silicon, manganese, titanium, boron, copper, aluminum and various other metals or compounds. Elements such as nickel can be flashed (electroplated) onto the surface of the chromium-iron alloy or directly incorporated into the chromium-iron alloy, i.e. the stainless steel.

In accordance with another aspect of the present invention, the metal strip is plated, metal sprayed or hot dipped with an intermediate metal barrier prior to applying the metal alloy coating to the strip surface. The intermediate metal barrier provides additional corrosion resistance, especially against halogens such as chlorine. The metal barrier preferably is tin, nickel, copper or chromium. Other metals such as aluminum, cobalt, molybdenum, Sn-Ni or Fe-Ni are also used. The metal barrier is applied to the metal strip to form a very thin metal layer. Although the metal alloy coating provides excellent protection against most corrosion-producing elements and compounds, and forms a strong bond with the metal strip, the inclusion of the intermediate metal barrier enhances the bonding and/or corrosion resistant characteristics of the metal coating alloy. The nickel is preferably flashed or plated to the metal strip surface. Nickel plating of the metal strip has been found to improve corrosion-resistance especially against compounds such as chlorine which have the ability to penetrate the metal alloy coating and attack and oxidize the surface of the metal strip thereby weakening the bond between the metal strip and the metal alloy coating. The nickel barrier has been found to provide an essentially impenetrable barrier to these elements and/or compounds which in fact penetrate the metal alloy coating. Due to the very small amount of these compounds penetrating the metal alloy coating, the thickness of the nickel barrier is preferably maintained at an ultra-thin thicknesses while still maintaining the ability to prevent these components from attacking the metal strip. The metal alloy coating and thin nickel coating effectively complement one another to provide superior corrosion resistance. Tin, chromium and copper also form an intermediate metal barrier layer which improves the bonding of the metal alloy coating to the metal strip. These metals have also been found to improve the corrosion-resistance of the formed intermetallic layer and inhibit the zinc intermetallic layer growth which causes problems with dross formation and impair mechanical properties, i.e. cracking due to forming. The copper is plated onto the surface of the metal strip. The plated copper layer is formed by passing the metal strip through a standard electroplating process or by adding copper sulfate to a pickling solution and pickling the copper strip. Chromium is plated to the metal strip by a conventional plating process. Tin is coated onto the metal strip by hot dipping, plating or metal spraying.

In accordance with still another aspect of the present invention, the intermediate metal barrier layer is pre-heated and/or flow heated prior to the plated strip being hot dipped. The heating of the plated metal causes an intermetallic layer to begin to form and complete its formation once the strip has been hot dip coated. Such a pre-heating process results in the varying of the intermetallic layer composition which results in improved bonding and/or corrosion-resistance.

In accordance with the broad aspect of the invention, the metal strip passes into a molten bath of coating alloy. The molten alloy is an alloy primarily including tin and zinc. The two-phase (binary) tin and zinc alloy is essentially lead-free and is defined as a coating alloy containing no more than about 0.5 percent lead. Preferably less than 0.1 percent lead and more preferably less than 0.05 percent lead is included in the coating alloy. The temperature of the molten alloy is at least 449° F. The metal alloy must be maintained above its melting point or improper coating will occur. Tin melts at 232° C. (450° F.). Zinc melts at 419.6° C. (787° F.). Metals such as iron, nickel, aluminum, zinc, titanium, copper, magnesium, bismuth and antimony when added to the metal alloy raise the melting point of the metal alloy. For instance, the alloy is heated to temperatures as high as 538° C. (1000° F.) when copper is added to the alloy. Higher or lower temperatures are used to accommodate the addition of other metal additives or for the coating of other alloy compositions. In order to accommodate for high temperatures, the melting pot (coating tank) is made to withstand these higher temperatures such as increasing the thickness of the melting pot and/or using special high temperature melting materials for the construction of the melting pot.

The coating of the molten metal alloy onto the metal strip forms an intermetallic layer between the surface of the metal strip and the layer of coating alloy. The intermetallic layer formed by metal atoms of the coating alloy molecularly intertwining with metal atoms on the surface of the metal strip as the molten coating alloy coats the metal strip. The heat from the molten alloy excites the surface atoms on the metal strip and facilitates in the intertwining of the atoms from the metal alloy coating into the metal strip. The formation of the intermetallic layer results in a strong bond between the metal alloy coating and the metal strip and intermediate layer, if applied to the metal strip. This thin intermetallic layer is not created in a electroplating process since the plated alloy is not hot enough to create the intermetallic layer. The intermetallic layer is in-of-itself a corrosion-resistant layer. The melting pot is maintained at a high enough temperature to heat the metal strip, coat the metal strip and form the intermetallic layer. The temperature of the melting pot is maintained several degrees above the molten coating alloy so as to prevent the molten alloy from solidifying when the metal strip enters the melting pot.

In accordance with another aspect of the present invention, the residence time of the metal strip in the melting pot is selected to properly coat the metal strip and form the intermetallic layer. Preferably, the metal strip is maintained in the melting pot for at least 5 seconds and less than 2–10 minutes and preferably less than one minute. Applicants have also discovered that an intermetallic layer which includes tin, chromium and iron forms a highly corrosion-resistant layer. Such an intermetallic layer composition is formed by hot dip coating stainless steel with a tin and zinc containing coating alloy, by hot-dip coating a ferrous strip with a coating containing tin, zinc and chromium and/or by coating a ferrous strip plated with chromium and hot-dip coating the plated strip with tin and zinc. The thickness of the intermetallic layer is very thin and preferably 1–10 microns ($3.0 \times 10^{-5}$–$3.9 \times 10^{-4}$ inch) thick.

In accordance with another aspect of the present invention, the alloy coating provides for a corrosion-resistant coating that protects the surface of the metal strip from oxidation and which is environmentally friendly thus immune from the prejudices associated with lead containing metal strip. The tin and zinc of the two-phase (binary) alloy system makes up at least 80 weight percent of the alloy and preferably makes up to at least 90 weight percent of the alloy and more preferably at least 95 weight percent of the alloy and even more preferably at least 98 weight percent of the alloy.

In accordance with another aspect of the invention, bismuth, antimony, nickel, aluminum, chromium, titanium, copper, iron and/or magnesium are added to the metal alloy coating to enhance the physical properties of the metal alloy, improve corrosion resistance, improve grain refinement, inhibit oxidation, inhibit dross formation during coating, stabilize the metal alloy, and/or inhibit the crystallization of the tin in tin and zinc containing metal alloys. The two-phase (binary) tin and zinc metal alloy preferably contains metal stabilizing additives. When tin crystallizes, the bonding of the tin and zinc alloy coating to the metal strip weakens and results in flaking of the coating. The addition of small amounts of stabilizing metals, such as bismuth, antimony, copper and mixtures thereof in an amount of at least 0.005 weight percent prevents and/or inhibits the crystallization of the tin. Bismuth and/or antimony also enhances the hardness, strength, mechanical properties and corrosion resistance of the metal alloy coating. Nickel, as a small additive, has been found to provide additional corrosion protection to the two-phase (binary) tin and zinc alloy coating especially in alcohol containing environments, such as for gasoline tanks. Copper can be added to the two-phase (binary) tin and zinc alloy coating systems, in addition to its stabilizing properties, as a coloring agent to reduce the reflective properties of the newly applied metal alloy and/or to obtain the desired coloring of the weathered metal alloy coating. Copper also improves the corrosion-resistance of the metal alloy coating especially in marine environments. Magnesium, when added in small amounts, has been found to improve the flow or coating properties of a two-phase (binary) tin and zinc alloy system so that more uniform coating is applied to the metal material strip. Magnesium also reduces the anodic characteristics of the coating to further increase the corrosion-resistance of the metal alloy coating. The magnesium also reduces oxidation of the molten metal alloy and/or reduce dross formation during the coating of the metal alloy. Aluminum is added to the two-phase (binary) tin and zinc alloy system to inhibit oxidation of the molten metal alloy and to reduce dross formation on the metal alloy coating. Aluminum also reduces the thickness of the intermetallic Fe-Zn layer resulting from zinc containing metal alloys so as to improve the formability of the coated metal strip. Titanium is added to a two-phase (binary) tin and zinc alloy system, in small amounts, to improve the grain refinement of the coated metal alloy and to increase the hardness and the strength of the metal alloy. Titanium also prevents oxidation of the molten metal alloy and helps reduce dross formation.

In accordance with another aspect of the present invention, the thickness of the metal strip is not more than about 0.2 inch and is preferably less than 0.05 inch and more preferably less than 0.03 inch and preferably greater than 0.005 inch. The strip thickness must not be too great so as to prevent the strip from being directed, at a high speed, through the pretreatment process, if any, and the coating process. Metal strip, such as stainless steel, carbon steel or titanium, which have a thickness greater than 0.03 inch is very difficult to maneuver at economical, high speeds through the coating process. A "strip" is defined as metal that is shipped to the coating process in coils, as opposed to plates. In addition, obtaining heat or temperature equilibrium of the strip during hot-dipping to properly form an intermetallic layer between the strip surface and coating alloy is very difficult with a thick strip at high speeds. Strip thicknesses which are less than 0.005 inch may break as the strip passes at high speeds and/or are under tension when being passed through the molten coating alloy. The thickness of the strip is also selected so that the formed or drawn coated strip is strong and durable enough for its intended end purpose. When stainless steel strip is used, 304 or 316 stainless strip having a thickness of 0.005–0.03 inch is preferable.

In accordance with another aspect of the present invention, the metal strip is pre-treated prior to applying the metal alloy coating. The pretreatment process includes several steps for metals such as stainless steel or includes only a few steps for metals which are easier to clean and/or have a pre-activated surface when received in coil form. Commercial stainless steel usually has a passivated surface which is difficult to consistently and uniformly coat in a high speed hot-dipped process. "High speed" means a residence time in a molten bath of less than 1.0 minute and less than 30 seconds. The metal strip is moved through the molten bath at rates of 1–400 ft/min and preferably 50–250 ft/min. The pretreatment process is preferably similar to the process disclosed in Assignees' U.S. Pat. No. 5,395,702 and incorporated herein.

In accordance with yet another aspect of the present invention, the metal alloy coating is applied to the metal strip by a continuous hot-dip process. The metal strip is preferably passed through a molten metal alloy at a relatively constant speed. The speed of the metal strip is preferably maintained from 1–400 ft/min. Prior to the development of coated metal strip by Applicants, corrosion-resistant material was made by (a) a batch hot dip process of immersing downwardly, holding for a preselected time and withdrawing upwardly a metal sheet article into and out of an electrolysis tank, or (b) in a process of moving discrete lengths of a sheet or a continuously moving metal strip into and out of the electrolysis tank in a direction longitudinal of the sheet. This second process was costly and required expensive equipment and complicated electrical conduction networks. The batch hot dip process is defined as a process whereby a discrete sheet of material is immersed into a molten bath of coating metal, held in the bath for a preselected time and then withdrawn (i.e. shifted upwardly) from the molten metal bath. Another type of batch hot dip process is where a length of sheet material is moved into a molten bath of coating metal, often on conveying rollers, retained in the melting pot and then withdrawn from the melting pot. The actual movement of the length of sheet material in and out of the molten metal is either vertically or longitudinally, guided by several guide rollers located in the melting pot. The batch hot dip process is accomplished with a variety of equipment used to move the sheet material into the molten bath, hold the sheet in the molten metal for a given time and then move the sheet material from the melting pot, either vertically or longitudinally in a path dictated by guide rollers. The batch hot dip process was tried by Applicants with limited success in appearance or coating quality. Metal sheets which were vertically dipped (i.e. the most common "hot dip" process) exhibited running and streaking of the coating and poor coating distribution. Discrete pieces of sheet metal which were longitudinally rolled into and out of the melting pot exhibited poor coating distribution primarily due to the interferences from the guide rollers which were necessary to guide the discrete metal sheets into and out of the melting pot. The motive force for movement of the sheet into and out of the melting pot was by the driving effect of the rollers in the melting pot, these rollers being in contact with the coating metal. The same problems recognized in Ohbu U.S. Pat. No. 3,962,501 (Nippon Steel) were encountered by Applicants when using conventional batch hot dip processes. It was found that the mere addition of metal, such as aluminum, as taught in Ohbu '501, did not solve the failure of the alloy to stick or bond, nor did it create a totally acceptable appearance. The sheets did have use, but were not the ultimate solution of our overall objectives. Nippon Steel apparently found the use of aluminum was not the solution, since Nippon Steel later filed an application for electroplating as disclosed in Japanese Publication No. 56-144738 (1993). The continuous hot tip process developed by Applicants for the coating of a metal strip with a two-phase (binary) tin-zinc alloy coating was not by original design, nor was coating quality expected to be advantageously affected by such a process. The coating of a metal strip by a continuous hot dip process of the present invention included the coating a zinc/tin, two-phase (binary) providing of a sheet steel material as a continuous strip of relatively indefinite length and moving the strip continuously through the melting pot in a curvilinear path thus requiring few, if any, guide rolls (no driving rollers) so that the metal sheet material was no longer immersed in, held, and then withdrawn from the molten metal in a melting pot as we had done before using normal hot dip process. It was surprisingly found by Applicants that this continuous strip type hot dipping process formed a completely different sheet product from the prior efforts to use the standard batch or discrete hot dip process. This continuous hot dip process produced a product superior to a product coated by the hot dip process of immersion, hold and withdrawal as taught in the Ohbu '501 patent and other processes for batch hot dip coating of sheet material. The continuous strip type hot dipping process of the present invention inherently produces a different end product than for products coated in a batch hot dip process which includes immersing a finite length of sheet material into a melting pot, holding the sheet in the melting pot and then removing the sheet from the melting pot. The continuous strip type hot dipping process allows the strip to dictate the path in the molten alloy bath and does not give the results of the in, hold, and out type of batch hot dip process of discrete sheet material or other metal articles. The coated strip coated by a continuous hot dip process also produces a coated strip or sheet which is also quite different from a sheet plated by electroplating. The continuous hot dip coated metal strip also has the distinct advantages over electroplated coatings in that the coating process is much simpler forms a much greater coating thicknesses contains substantially fewer pinholes or surface discontinuities than plated coatings.

A continuous strip type hot dip process as used in accordance with the present invention is produced by unrolling a metal strip from a roll of strip and continuously passing the strip at a relatively constant speed through a melting pot containing a molten metal coating alloy. Select dipping of metal articles or a piece of sheet material is not involved in a continuous strip type hot dip process. A metal strip coated in a continuous strip type hot dipping process when cut into discrete sheets is readably distinguishable from metal sheets coated by a hot dip batch process. The coating thickness of a coating in a hot dip process is a function of the time the metal strip is resident or immersed in the molten metal. As disclosed in Galland U.S. Pat. No. 4,015,950, the coating thickness increases the longer the meatal material is maintained in the molten metal. In a batch hot dip process, the resident time of immersion is different from various regions on the metal sheet material. When the metal sheet is hot dipped, the leading edge of the metal sheet is the first to enter the molten metal and the last to leave the molten metal. The additional residence time of the leading edge of the metal sheet and adjacent areas of the metal sheet cause the coating to form a thicker coating on the metal sheet in these regions. Such variances in coating thicknesses are readably distinguishable from uniform coating thicknesses formed by a continuous strip type hot dipping process of the present invention. Furthermore, long immersion times to make the coating uniform form an overly thick coating, thus requiring the coating to be ground off or removed by an oxidation agent. Such additional processing steps make the product different. Furthermore, the removal of the coating to form a uniform thickness will expose different coating compositions as illustrated in Galland '950. Such exposed coating compositions are different from coatings produced by continuous strip hot dip processes. The resulting ground coating has an inferior corrosion-resistance and other different properties from an unground exterior coating surface. In any respect, such post-treatment of the coating to obtain uniform thicknesses, if possible, on the metal sheet will be visually different from a metal strip coated in a continuous strip type hot dipping process of the present invention. Irrespective of how the coating alloy is formed by a batch hot dip process, the growth of the intermetallic layer will not be uniform since the growth is a function of residence time in the melting pot. A metal strip coated in a continuous strip type hot dipping process can be quickly, efficiently and economically coated with a metal alloy coating having a uniform thickness and produces a superior product. In a continuous strip type hot dipping process, the resident times of the strip surface on both sides of the strip and the strip edges in the molten bath are equal. The uniformity of residence time in the molten metal results in uniform coating thicknesses on the surface of the metal strip and uniform intermetallic growth. This gives superior bonding. The resident time of the metal strip in the melting pot is controlled by the strip speed and the length of the melting pot. The drawbacks of non-uniform coating thickness commonly associated with products formed in a batch hot dip process are overcome by products coated in a continuous strip type hot dipping process of the present invention. Differences in coating characteristics of products coated in a batch process and products coated in a continuous strip type hot dipping process are readily apparent by visual inspection of the metal coated surface and visual inspection of the cross-section of the coated surface. Corrosion-resistance testing also reveals the differences in products coated by a continuous strip type hot dipping process or a batch hot dip process.

The surface quality of products coated by continuous strip type hot dipping process and by batch hot dip process is also visually apparent. A metal sheet coated in a batch hot dip process by dipping the discrete metal sheet into a melting pot and subsequently removed from the melting pot will exhibit running or streaking of the coating as the sheet is removed from the melting pot. The running or streaking of the coating is due to gravity acting on the molten coating alloy as the sheet is slowly removed from the melting pot. This streaking adversely affects the surface morphology of the coated sheet by forming uneven surfaces and non-uniform thickness throughout the coated metal sheet surface. The running or streaking of the coating also results in the metal alloy coating accumulating about the leading edge of the metal sheet and reduced coating thicknesses about the back edge of the sheet. Further processing of the immersed metal sheet by a batch hot dip process is necessary to even out the metal alloy coating and reduce accumulation of the metal alloy coated about the leading edge of the metal sheet. A product formed by a continuous strip type hot dipping process of the present invention overcomes the running and streaking problem inherent with using a batch hot dip process. A metal strip coated in a continuous strip type hot dipping process is resident in the melting pot for a uniform time by maintaining a constant strip speed as the metal strip continuously passes through the melting pot. The constant strip speed not only maintains a constant resident time of the strip in the melting pot, but also creates a smooth coated surface. As the metal strip passed through the molten metal at a constant speed, the molten metal about the strip both adheres to the moving strip and shears the coating from the moving strip. This shearing effect results from the viscosity of the molten metal alloy and the speed at which the metal strip is moving through the melting pot. For a given strip speed and molten metal alloy viscosity, a constant shearing effect is applied to the surface of the moving strip. The constant force of the shearing effect smooths the coated surface and facilitates in the formation of a constant coating thickness. A metal sheet material coated by a batch hot dip process does not take advantage of the shearing effect, thus resulting in running and streaking of the coating and a less effective bond. Further, batch hot dip process sheets include flux inclusions on the surface caused by the holding then withdrawal through the surface of the molten metal. In a continuous strip type hot dipping process, the unrestricted growth of the metal alloy coating on the surface of the strip is controlled thus reducing the incidence of surface defects thus improving the coating uniformity as compared to a metal sheet coated in a hot dip batch process. Uniformity of the coating thickness along and across the metal strip surface is an important factor affecting the quality and performance of the coated metal strip. The use of a continuous strip type hot dipping process to coat a metal strip provides metallurgically uniform surfaces by controlling the growth of the metal alloy coating on the strip surface thus reducing the formation of surface irregularities. Additionally, the metallurgical characteristics of the intermetallic layer formed by a continuous strip type hot dipping process are superior to an intermetallic layer formed by a batch hot dip process. The growth of the intermetallic layer depends on the composition of the metal sheet or strip, the composition of the coating alloy and the time/temperature history of the growth and solidification of the metal alloy coating on the metal sheet or strip. The growth and solidification of the metal alloy is better controlled in a continuous strip type hot dipping process, thus, forming a visibly and physically superior coated metal strip material as compared to a metal sheet coated in a hot dip batch process. The sheet coated by the continuous strip type hot dipping process has been found to have a superior bonding of the coating to the metal base sheet.

As a result, products coated by a continuous strip type hot dipping process are different from products coated by a batch hot dip process in that the following characteristics are different and superior:

1) Uniformity of coating (weight and thickness)
2) Surface appearance
3) Smoothness
4) Texture control
5) Control of intermetallic phases (growth and uniformity)

In summary, metal strip coated in a continuous strip type hot dipping process of the present invention produces a metal sheet having superior uniformity of coating (weight and thickness), superior metallographic structure, superior surface appearance, superior smoothness, superior spangle size, superior orientation and fewer surface defects, and the composition of different phases is superior as compared to metal sheets coated in a batch hot dip process. In addition to surface appearance and uniformity of thickness, the formability is also improved due to more uniform thickness. In general, thicker coatings provide greater corrosion protection, whereas thinner coatings tend to give better formability and weldability. Thinner coatings with uniformity of thickness are characteristics of a sheet having the novel zinc/tin, two-phase (binary) and produced by a continuous strip type hot dipping process of the present invention.

In accordance with another aspect of the present invention, the melting po includes a flux box whereby the metal strip passes through the flux box and into the molten alloy. The flux box preferably contains a flux which has a lower specific gravity than the molten metal alloy, thus the flux floats on the surface of the molten alloy. The flux removes residual oxides from the metal strip surface, shields the metal strip surfaces from oxygen until the metal strip is coated with the molten metal alloy, inhibits the formation of viscous oxides at the point where the metal strip enters the molten metal alloy and inhibits dross formation on the metal strip. The flux preferably is zinc chloride solution.

In accordance with another aspect of the present invention, a protective material is placed over the surface of the molten metal alloy in the melting pot. The protective material has a specific gravity which is less than the molten metal alloy so that the protective material floats on the surface of the molten metal alloy. The protective material shields the molten metal alloy from the atmosphere thereby preventing oxides from forming on the molten metal alloy surface. The protective material also inhibits dross formation on the coated metal strip as the coated metal strip exits from the melting pot. When the protective material is palm oil, the melting point of the metal alloy must be below the 650° F. degrading point for the palm oil. For coating alloys having higher melting point temperatures, special oils, fluxes, or other materials and/or special cooling procedures for the protective material are employed.

In accordance with another aspect of the present invention, the continuously moving coated metal strip exiting the melting pot is subjected to an air-knife process. In an air-knife process, the coated metal strip is subjected to a high velocity gas. The high velocity gas strips surplus molten metal alloy coating from the metal strip, smears the molten metal alloy coating over the metal strip to cover pin holes, if any, improves the grain size of the metal alloy coating, reduces lumps or ribs of molten metal alloy coating forming on the surface of the metal strip and reduces the coating thickness of the molten metal alloy coating. The high velocity gas is air or an inert gas which does not oxidize with the molten metal alloy. Preferably, the gas is an inert gas such as nitrogen, sulfur hexafluoride, carbon dioxide, hydrogen, noble gases and/or hydrocarbons. When an inert gas is used, the protective material on the surface of the molten metal alloy in the melting pot (i.e. palm oil) is preferably eliminated since the inert gas prevents dross formation, viscous oxide formation in the region in which the inert gas contacts the molten metal alloy in the melting pot. The high velocity inert gas also breaks up and pushes away any dross or viscous oxides from the surface of the molten metal alloy in the melting pot in the region the inert gas contacts the molten metal alloy thereby forming an essentially dross free—viscous oxide free region for the coated metal strip to be removed from the melting pot. The high velocity gas is preferably directed onto both sides of the coated metal strip and at a direction which is downward toward the melting pot and at a direction which contacts the coated metal strip at an angle which is not perpendicular to the surface of the coated metal strip. This direction of the gas directs the removed molten metal coating alloy back into the melting pot.

In accordance with still another aspect of the present invention, the thickness the molten metal alloy coating is controlled by one or more sets of coating rollers. The coating rollers form a smooth and uniform metal alloy coating layer on the metal strip. When palm oil is used as a protective material on the surface of the melting pot, the coating rollers are preferably partially or totally immersed in the palm oil. The palm oil facilitates in quality distribution of the metal alloy coating layer onto the metal strip. The thickness of the metal alloy coating on each side of the metal strip is at least 0.0001 inch and is preferably 0.0003–0.05 inch and more preferably, 0.001–0.003 inch. The thickness of the metal alloy coating is also regulated by the residence time of the metal strip in the melting pot, the temperature of the metal alloy in the melting pot and the use of an air-knife process. The thickness of the alloy coating coated on the metal strip will also be dependent on the speed at which the metal strip travels through the alloy. A strip speed above 400 ft/min results in high shear forces which interferes with proper coating resulting in improper or defective alloy coating of the metal strip. When an air-knife process is employed, the coating rollers are preferably used in conjunction with the air-knife process or alternatively, the coating rollers are completely eliminated.

In accordance with yet another aspect of the present invention, spray jets are preferably used to spray molten metal alloy onto the metal strip to ensure a uniform and continuous coating on the metal strip. The metal spray jets are preferably positioned adjacent to the coating rollers to ensure complete coating of the metal strip. The metal spray jets spray molten metal alloy onto the coating rollers and/or onto the metal strip. As the coating rollers rotate to allow the metal strip to pass between the coating rollers, the molten metal alloy sprayed on the rollers is pressed against the metal strip and fills in any pin holes or uncoated surfaces on the metal strip. The use of spray jets eliminates the need for two separate coating steps, especially when the invention is used for tin and zinc coating. When coating rollers are not used, spray jets are preferably used to spray the molten metal alloy directly onto the metal strip.

In accordance with another aspect of the present invention, the coated metal strip is passed through a leveler, whereby the coated metal alloy is uniformly molded about the metal strip. The leveler consists of a plurality of rollers. The coated metal strip is passed through the rollers to smooth out the metal alloy coating on the metal strip. The metal strip is preferably maintained at a tension as it is passed through the leveler.

In accordance with another aspect of the present invention, the coated strip is coiled into coils for later processing on high speed presses, such as used in the automotive field. Alternatively, the coated metal strip is sheared after it has been cooled or leveled. Since the metal strip is a continuously moving metal strip, the shearing device travels next to and at the same speed as the coated metal strip to properly shear the moving strip. When the metal strip is not cut, the metal strip is rolled into a roll of coated strip for ease of transport and/or for use in subsequent treatments and/or forming (i.e. roof materials). The continuous processing of the strip from roll to roll facilities in the ease, efficiency and cost effectiveness of coating a metal strip.

In accordance with another aspect of the present invention, the coated metal strip is treated with a weathering agent to accelerate the weathering and discoloration of the metal alloy coating. Metal alloy coatings containing high concentrations of tin are commonly highly reflective. To reduce the reflectivity of such metal alloy coatings, the weathering material is applied to the metal alloy coating to oxidize the metal alloy coating surface and reduce the reflectivity of the metal alloy coating. The weathering material is an asphalt-based paint which causes accelerated weathering of the metal alloy coating when it is exposed to the atmosphere. The asphalt-based paint significantly decreases the weathering time of the metal alloy coat to less than a year. The asphalt paint is preferably a petroleum-based paint which includes asphalt, titanium oxide, inert silicates, clay, carbon black or other free carbon and an anti-settling agent. The asphalt-based paint is preferably applied at a relatively thin thickness so as to form a semi-transparent or translucent layer over the metal alloy coating. The thickness of the asphalt-based paint ranges between 0.25 to 5 mils (0.00025–0.005 inch) and preferably is 1–2 mils (0.001–0.002 inch). Once the translucent paint has been applied to the coated metal strip, the weathering material is dried, preferably by air drying and/or heated by heating lamps.

In accordance with yet another feature of the present invention, the metal alloy coating composition is such that the coated metal strip is formed on site without the metal alloy coating cracking and/or flaking off. The amount of zinc is controlled and stabilizers are used to prevent the coating alloy from becoming too rigid and brittle and to also inhibit the formation of zinc oxide.

In accordance with an aspect of the present invention, the metal strip is provided in a large coil and then moved continuously as a continuous moving strip through the bath containing a metal coating alloy.

In accordance with an aspect of the invention, a thin ferrous strip is uncoiled and passed longitudinally through a molten bath of a coating alloy comprising at least about 15% by weight tin and at least 10% by weight zinc at a speed so that an intermetallic layer is formed between the coating alloy and the surface of the ferrous strip. When the thin strip includes chromium, as well as iron, it is defined as a "stainless steel" strip. The thin strip is continuously passed through an electrolytic tank to coat an ultra thin layer of tin, chromium, nickel or copper on the moving strip prior to hot dip coating. This coating or "flashing" of tin, chromium, nickel or copper does not interfere with the formation of intermetallic layer and improves the bonding and corrosion resistance of the coating alloy.

In accordance with another aspect of the present invention, when flashing on tin, the tin is heated to cause it to flow before the subsequent hot dip coating process.

In accordance with still another aspect of the present invention, the metal strip is provided in a large coil, passed through a preplating bath generally without preheating and then moved continuously as a continuous moving strip through a molten bath containing a coating alloy of zinc and tin with tin having a concentration of at least 15 weight percent to provide a sufficient amount of tin to form a two-phase (binary) system and to overcome the galvanizing of the strip. The zinc concentration is at least 10 weight percent to form the two-phase (binary) system. The tin concentration plus zinc concentration is at least 80 weight percent and preferably over 90 weight percent. The zinc-tin two-phase (binary) alloy is not merely zinc with a small amount of tin to trim the galvanizing of the moving strip. It is common practice to continuously galvanize moving strip. This invention is different in that the bath contains a major amount of tin of at least 15 weight percent to change the galvanizing properties and appearance of the coated strip. The coated strip is then recoiled for shipment and used in mass production of products, such as building products and gasoline tanks for motor vehicles. Without changing the coating ease of the two-phase (binary) alloy including zinc and tin., the alloy may include copper but preferably not more than about 20% by weight of coating material. This coating material increases corrosion-resistance, especially in marine environments. The copper is added as brass. Another improvement to the zinc-tin alloy with copper is the further inclusion of small controlled amounts of aluminum. Typically, the aluminum content is up to 2.0 weight percent and preferably about 0.3%. This preferred embodiment is a two-phase (binary) zinc-tin coating alloy with copper and up to 0.5% aluminum. The aluminum is added as an alloy of aluminum, copper and magnesium. It has been found that titanium prevents oxidation and improves the grain refinement of the two-phase (binary) zinc-tin coating alloy. Preferably, up to 1.0 weight percent titanium can be used. This preferred embodiment includes the novel two-phase (binary) zinc-tin alloy with titanium up to about 0.15%. Antimony improves corrosion-resistance of the two-phase (binary) zinc-tin coating alloy. In a preferred embodiment, the coating material is the zinc-tin alloy with antimony up to 2.0 weight percent and preferably about 1.0%.

As an example of a coating material of the invention, the material has a base of the zinc-tin alloy with:

Copper up to: 2.0%

Aluminum up to: 0.5%

Titanium up to: 0.15%

Antimony up to: 2.0%

As another example, the zinc-tin alloy has:

About 1.0% copper

About 0.3% aluminum

About 1.0% antimony

The alloy and additions above have further examples adding bismuth up to 1.7%; magnesium up to 0.4% and nickel up to 1.0%. Further, the basic coating alloy with additives can be coated on a moving strip with a flash of nickel to improve corrosion. The strip is preferably steel strip of less than about 0.10 inches (preferably less than about 0.03 inches) and the coating is greater than about 0.0001 inch and preferably 0.001–0.003 inches. The strip is continuously moved through the molten two-phase (binary) tin-zinc alloy to give uniformity of coating, ability to airknife and to provide any commercial success of the product. The two-phase (binary) alloy is not zinc with a minor additive of tin, copper, titanium, aluminum, antimony, etc. The tin content of at least 15 weight percent modifies the zinc, as used in galvanizing, to achieve a non-galvanized continuous two-phase (binary) tin-zinc coating. It has been discovered that by adding zinc in the amounts of at least 10 weight percent of the tin-zinc alloy to form a two-phase (binary) system, the corrosion-resistance of the two-phase (binary) metallic coating is significantly increased as compared to a protective coating essentially composed of single phase tin. Historically, it was believed that two-phase (binary) systems provided less corrosion-resistance protection than single phase systems. This belief was partially derived from the fact that the bonding between different types of metals is irregular and sometimes weaker, thus making the coating more susceptible to corrosion. Although the exact reasons for this physical phenomenon of increased corrosion-resistance due to the combination of zinc and tin is unknown to the inventors, it has been found that by adding zinc to tin, the two-phase (binary) metallic coating exhibits corrosive-resistant properties which exceed that of tin coatings, zinc coatings and, in some environments, that of a terne coating.

In accordance with another feature of the present invention, the metal alloy exhibits excellent soldering characteristics such that various electrodes including lead and no-lead electrodes can be used to weld the coated metal.

The primary object of the present invention is the provision of a metal strip coated with a metal alloy having high corrosion resistant properties.

Another object of the present invention is the provision of a metal strip coated with a two-phase (binary) metal alloy including a majority of tin and zinc.

Another object of the present invention is the provision of applying a thin metal intermediate barrier to the surface of the metal strip prior to applying the metal alloy coating.

Another object of the present invention is the provision of an metal strip treated with a metallic coating that is not highly reflective.

Yet another object of the present invention is the provision of a metal strip having a two-phase (binary) tin and zinc coating which weathers to a grey, earth-tone color.

Yet another object of the present invention is the provision of a metal strip having a metallic alloy coating which is essentially lead free.

Still yet another object of the present invention is to provide a metal alloy coating applied to a metal strip which strip is formed and sheared to form various building and roofing components, gasoline tanks, and other formed metal strip that are subsequently assembled on site or in a forming facility without the metal alloy coating flaking off, chipping, shearing, cracking and/or forming large exposed areas on the surfaces of the metal strip.

Still another object of the present invention is the provision of providing a metal alloy coated strip which strip are preformed into roof pans or gasoline tanks and the roof pans are subsequently seamed on site either by pressed seams, welded seams or soldered seams into waterproof joints.

Yet another object of the present invention is the provision of coating a metal strip by a continuous, hot-dipped process wherein the strip has a controlled residence time in a molten bath as the strip moves longitudinally through the bath.

Yet another object of the invention is the provision of a coated metal strip which is corrosion-resistant, economical to produce and capable of being formed into a variety of shapes while not containing objectionable amounts of lead.

Another object of the present invention is the addition of a coloring agent to the metal alloy to dull the color of the metal alloy.

Still yet another object of the present invention is the addition of copper to the metal alloy to color the alloy and/or improve the corrosion-resistance of the metal alloy.

Yet another object of the present invention is the addition of magnesium to a two-phase (binary) tin and zinc metal alloy to improve the flow characteristics and corrosion-resistance of the metal alloy.

Another object of the present invention is the addition of titanium to a two-phase (binary) tin and zinc metal alloy to positively affect grain refinement in the metal alloy.

Yet another object of the present invention is the addition of titanium to a two-phase (binary) tin and zinc metal alloy to reduce oxidation of the molten metal alloy.

Still yet another object of the present invention is the addition of aluminum to the metal alloy to reduce oxidation of the molten metal alloy.

Another object of the present invention is the provision of a method of applying a protective metal alloy coating to a continuously moving strip metal, which method is economically acceptable and has essentially no lead.

Yet another object of the present invention is a metal alloy, as defined above, containing antimony and/or bismuth to harden the metal alloy and to inhibit crystallization of the tin in the metal alloy.

Another object of the invention is the provision of a metal strip coated with a metal alloy containing zinc and/or iron to enhance the strength and hardness of the metal alloy.

A still further object is to provide a metal alloy coating which has superior corrosive characteristics permitting a thinner coating of the metal alloy to the metal strip than that which is required for conventional terne coatings with the high lead content.

Another object of the invention is to provide a metal alloy coating that is soldered with conventional tin-lead solders or no-lead solders.

Still another object of the present invention is the provision of unwinding of a roll of strip metal, subjecting the continuous moving strip to a process which forms a protective layer on the strip, and re-rolling said processed strip.

Still yet another object of the present invention is the provision of using spray jets which spray metal alloy coating onto the coating rollers and/or metal strip surface to eliminate non-coated surfaces on the metal strip.

Another object of the present invention is the provision of coating the hot-dipped coated metal strip with a weathering material to accelerate the dulling of the surface of the metal alloy coating.

Still a further object of the present invention is the provision of a coated metal strip which does not require intentional oxidation to produce a non-highly reflective surface.

Still another object of the present invention is the use of an air-knife process to control the thickness and quality of the metal alloy coating on the metal strip.

Yet another object of the present invention is the formation of an intermetallic layer between the base metal of a strip and the metal alloy, which intermetallic layer is formed by hot dip coating the metal alloy onto the metal strip and which forms a strong bond between the metal strip and the metal alloy coating.

Yet another object of the present invention is a metal strip with a pre-colored surface which is consistent and quite similar to weathered terne coated strip without any lead.

Still a further object of the present invention is the provision of producing a highly corrosion-resistant metal strip that is economical to make by a continuous hot-dip process.

These and other objects and advantages will become apparent to those skilled in the art upon reading of the detailed description of the invention set forth below.

BRIEF DESCRIPTION OF THE DRAWINGS

FIGS. 1a–1b are a cross-sectional view of the process of hot-dip metal alloy coating of metal strip as defined in the present invention.

DESCRIPTION OF THE PREFERRED EMBODIMENT

Figure 2:
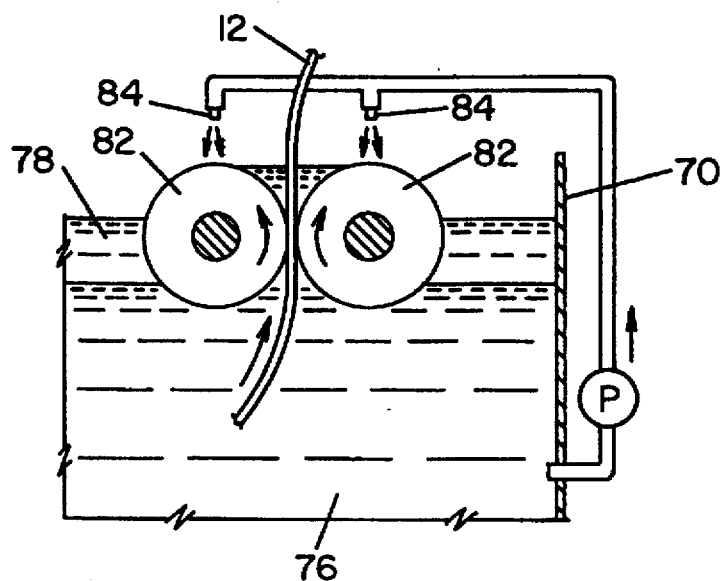
FIG. 2 illustrates a cross-sectional view of an alternative embodiment wherein metal spray jets are used during the hot-dip coating of the metal strip.

Referring now to the drawings, wherein the showings are for the purpose of illustrating preferred embodiments of the invention only and not for the purpose of limiting the same, reference is first had to FIGS. 1a–1b which illustrate the process for hot-dip coating a metal alloy on a metal strip.

The metal alloy is a two-phase (binary) tin and zinc corrosion resistive coating which prevents the coated metal strip from prematurely corroding when exposed to the atmosphere. The two-phase metal alloy contains a large weight percentage of tin and zinc and a very low amount or no amount of lead. The metal alloy is highly corrosive resistant, abrasive resistant, pliable, weldable and environmentally friendly. The metal alloy binds with the metal strip to form a durable protective coating which is not easily removable.

The amount of corrosion resistance protection provided by the metal alloy coating is of primary importance. Metal strip such as carbon steel and stainless steel oxidize when exposed to the atmosphere. Over a period of time the oxidized steel, commonly termed corrosion, begins to weaken and disintegrate the steel. The coating of the metal strip with the metal alloy acts as a barrier to the atmosphere which prevents the base metal from corroding. Although the metal alloy oxidizes when exposed to the atmosphere, the rate of oxidation is significantly slower than oxidation rates of metal strip such as copper, carbon steel and stainless steel. By coating the metal strip with the metal alloy, the life of the metal strip is extended for many years.

The pliability of the metal alloy is also important when the coated metal strip is to be formed. For architectural materials, such as roofing systems, the roofing materials are formed into various shapes and are usually folded to form seams to bind the roofing materials together to form a roofing system. A roofing material coated with a metal alloy that forms a rigid or brittle coating on the roofing material usually cracks or prevents the roofing materials to be properly shaped. Furthermore, a roofing material coated with a metal alloy which is brittle or rigid hinders or even prevents the roofing material from being properly folded to form the necessary seams to attach the roofing materials together.

The metal alloy must be solderable since roofing panels are commonly soldered together. The metal alloy coating of the present invention meets all these requirements by containing a majority of tin and zinc and extremely low levels of lead which produces a highly corrosive resistant metallic coating with relatively high pliability and are solderable to other materials.

The metal strip is preferably carbon steel, stainless steel or copper; however, the metal strip made of aluminum, bronze, nickel alloys, titanium and the like have also be successfully coated. When the metal strip is stainless steel, the strip is preferably 304 or 316 stainless steel. Metal strip is preferably used to apply a hot dip coating of a corrosion-resistant metal alloy.

As illustrated in FIGS. 1a–1b, strip 12 is preferably a stainless steel strip provided from a large metal roll 10. The thickness of strip 12 is 0.005–0.2 inch. Preferably, strip 12 is less than 0.05 inch and about 0.015 inch. Strip 12 is unwound from roll 10 at speeds which are preferably less than 400 ft./min. and more preferably between 70 to 250 ft./min. The strip speed is ultimately selected so that the residence time of the strip in melting pot 70 is less than 10 minutes and preferably less than one minute. Strip guides 13 are positioned throughout the hot-dip coating process to properly guide strip 12 through the coating process.

After metal strip 12 is unrolled from metal roll 10, strip 12 is optionally pretreated as described in U.S. Pat. No. 5,395,702 or immediately coated with an intermediate metal layer 143. Preferably, a stainless steel and carbon steel strip is pretreated to activate the strip surface prior to applying intermediate metal layer 143.

The intermediate metal layer 143 is preferably a single phase metal of tin, nickel, chromium or copper. The thickness of layer 143 is maintained such that it is an ultra-thin layer of not more than 3 microns ($1.18 \times 10^{-4}$ in.) and preferably has a thickness which is 1–3 microns. Applicants have found that the applied intermediate metal layer 143, such as tin, chromium, nickel or copper, forms a strong bond with the metal strip. The intermediate metal layer 143 has also been found to strongly bond to the hot dip tin and zinc alloy. The intermediate metal barrier layer is applied by an electroplating process. Metal strip 12 is continuously passed through electrolytic tank 40 which contains an electrolyte solution 42. The plating of the intermediate metal barrier layer is performed by standard electroplating techniques and further details for these techniques will not be further discussed.

The application of a tin intermediate layer to the metal strip surface has been found to advantageously change the composition of the intermetallic layer. Tin has been found to be a very important component of the intermetallic layer with respect to corrosion-resistance, metal alloy bonding and pliability. Higher tin concentrations in the intermetallic layer are obtained when the tin intermediate layer is applied to surfaces of the metal strip prior to hot dip coating. The tin intermediate layer also prevents the formation of a thick zinc layer in the intermetallic layer. The formation of zinc intermetallic compounds in the intermetallic layer occurs at rates which are dependent on the nature of the metal strip (i.e. composition, passivated) and the time/temperature history of the coated strip during the coating process. The zinc intermetallic growth causes problems with dross formation and mechanical properties of the strip (i.e. rigidity of the coated layer) which results in poor coating quality or cracking of the coating during forming and bending. Extensive growth of the zinc intermetallic layer formations gives rise to localized corrosion, cracking of the coating, operational problems during coating, and adversely affects performance of the coated strip in its particular application. The tin intermediate layer can alternatively be applied by hot dip coating in a molten bath of tin or sprayed on with molten tin. Once the tin layer has been applied to the surface of metal strip 12, the tin layer may be flow heated or pre-heated prior to hot dip coating. Flowing heating the tin coated strip causes a pseudo intermetallic layer to begin forming prior to the strip entering the molten coating alloy. The formation of the pseudo intermetallic layer has been found to result in a relatively high concentration of tin atoms in the intermetallic layer. When the tin plated coating is flow heated, the thickness of the coating is preferably at least about 2 microns so that a sufficiently thick coating exists for proper flow heating.

A chromium intermediate layer on the metal strip surface has been found to advantageously change the composition of the intermetallic alloy especially when the metal strip does not contain chromium. Chromium has been found to combine with tin to form a highly corrosion-resistant intermetallic layer. Metal strip such as carbon steel plated with chromium results in the formation of an intermetallic layer containing iron, chromium and tin. This intermetallic layer composition has been found to be highly corrosion-resistant. The chromium layer also inhibits the formation of the detrimental Fe-Zn layer. A modification of the invention includes flow heating or pre-heating the chromium plated layer prior to hot dip coating. The plating of a ferrous metal such as carbon steel converts the carbon steel into stainless steel as discussed above.

A copper intermediate layer on the strip surface enhances the corrosion-resistant properties of the coating alloy. The copper intermediate layer is preferably formed by standard electroplating techniques or alternatively by passing the strip into a pickling solution containing copper surface as the strip is being pretreated. Copper also colors the metal alloy to reduce the reflectivity of the metal alloy. Plating of the copper onto the strip prior to hot dip coating also allows the copper to be incorporated into the molten alloy and intermetallic layer without having to maintain the copper in molten form. The copper plated strip may also be pre-heated prior to hot dip coating to enhance the formation of the intermetallic layer. Copper plating also inhibits zinc intermetallic formation for coating alloys containing zinc.

A nickel intermediate layer on the strip surface enhances the corrosion-resistance of the coated strip. Plating the metal strip with nickel is also used to eliminate the need of the strip to be pre-treated and activated prior to hot dip coating. The bond between the metal alloy coating and the nickel layer is surprisingly strong and durable and thereby inhibits the metal alloy coating from flaking especially when the metal strip is formed. The plating of the metal strip with the nickel layer is very desirable when the metal strip is used in an environment which has high concentrations of fluorine, chlorine and other halogens. Although the metal alloy coating significantly reduces the corrosive effects of halogens on the metal strip, it has been found that by placing a thin layer of plated nickel between the metal strip and the metal alloy coating, the corrosive effects of the halogens are even further reduced. The strip plated with nickel has also been found to improve the corrosion-resistance properties of the intermetallic layer during the hot dipping process by combining with the components of the intermetallic layer. Nickel plating also inhibits zinc intermetallic formation for coating alloys containing zinc.

After strip 12 exits electrolytic tank 40, strip 12 enters flux box 72 located in melting pot 70. Flux box 72 contains a flux 74 having a specific gravity less than that of molten metal alloy 76. Flux 74 consists of a zinc chloride and ammonia chloride solution. Preferably, flux 74 contains about 50% zinc chloride and about 8% ammonia chloride. Flux 74 helps remove any remaining oxides on the surface of strip 12. Flux box 74 also acts as a barrier to oxygen and prevents oxides from forming on the surface of the molten metal alloy, which oxides interfere with proper coating of the metal strip.

In another embodiment of the present invention, strip 12 is preheated prior to entering melting pot 70. It has been found that metal strip of a thickness of less than about 0.03 inch need not be pre-heated to properly coat the metal strip and properly form the intermetallic layer. Metal strip thicknesses of greater than about 0.03 inch are defined as thick strip and such thick strip may need to be pre-heated. The pre-heating of the thick metal strip facilitates in the strip reaching temperature equilibrium with the temperature of the molten metal in melting pot 70. Thin metal strip has been found to quickly reach temperature equilibrium thus properly coating and forming the intermetallic layer.

Upon leaving flux box 72, strip 12 enters molten alloy 76. Melting pot 70 is maintained at a temperature several degrees above the melting point of metal alloy 76 so as to prevent solidification of metal alloy 76 as strip 12 enters melting pot 70. Molten metal alloy 76 in melting pot 70 is maintained at a temperature of preferably at least 10° F. above the melting point of metal alloy 76.

Melting pot 70 is preferably 10-100 ft. in length so as to provide adequate residence time of the metal strip as it is passing through the melting pot. Longer melting pot lengths are employed for very fast moving strip.

Melting pot 70 is divided into two chambers by barrier 80 so as to prevent protective material 78, such as palm oil, from spreading over the total surface of molten metal alloy 76 in melting pot 70.

Molten metal alloy 76 is a two-phase tin and zinc alloy. The two-phase zinc-tin metal alloy coating is a special combination of tin and zinc. It has been found that the addition of zinc in the amount of at least 10 weight percent of the tin-zinc alloy enhances the corrosion resistance of the two-phase metallic coating in various types of environments as compared to a protective coating essentially composed of tin. The tin content of the two-phase metal alloy is significant so to result in a two-phase alloy instead of a galvanizing coating metal. The tin is at least 15 weight percent of the alloy and preferably 15-90 weight percent of the metal alloy coating. The zinc content of the metal alloy is preferably the major component of the two-phase alloy; however, the zinc in the two-phase zinc-tin alloy can be as low as about 10 weight percent of the metal alloy and ranges from 10-85 weight percent of the metal alloy. The tin plus zinc content of the tin-zinc alloy is preferably greater than 90 weight percent and more preferably at least about 95 weight percent.

As is well known in the art, a two-phase metal alloy system is a combination of two primary metals forming a composite alloy where each of the two-phase constituents maintain their own integrity (structure or composition) with one phase being a matrix surrounding distinct globules or phases of the second phase metal. The two-phase system is a dual strata of metal globules or phases, each globule or phase is distinct from the other in structure or composition. For a tin and zinc two-phase alloy as required by the invention, distinct zinc globules or phases are formed in a matrix comprising a eutectic mixture of tin-zinc. The globules or phases and matrix define layers or regions throughout the coating layer. A eutectic tin-zinc mixture is a tin rich mixture containing about 91 weight percent tin and about 9 weight percent zinc. For the defined tin rich matrix or phase and zinc rich globules or phases to form in a two-phase tin and zinc alloy, the zinc must make up over about 10 weight percent of the alloy. Zinc in excess of about 10 weight percent of the alloy causes the zinc to precipitate out of the tin-zinc eutectic mixture (tin rich phase) and form zinc globules or phases within the eutectic tin-zinc (tin rich) matrix. The tin content of the alloy must make up over about 15 weight percent of the alloy so that there is a sufficient amount of tin within the alloy to form the eutectic tin-zinc matrix to give the required two phase characteristics to the coating. Metal additives can be added to the two-phase tin and zinc alloy in small amounts without disturbing the two-phase structure of the alloy. The content of the metal additive must be controlled so that the metal additives mix with the metal alloy within the eutectic tin-zinc (tin rich) matrix and/or the zinc rich globules or phases without forming a third, fourth, fifth, etc. phase in the alloy and/or disrupting the eutectic tin-zinc (tin rich) matrix or the zinc rich globules or phases. When determining the composition of the two phase tin and zinc alloy of the present invention, the environment the coating is to be used in must be considered. In some situations, high tin is beneficial to limit the amount of zinc rich globules or phases in the two phase alloy. In other situations, it has been found that larger amounts of zinc should be added to increase the number and/or size of the zinc rich globules or phases within the two phase alloy. The addition of small amount metal additives such as copper, titanium or others to the binary system do not disrupt the eutectic tin-zinc (tin rich) matrix or phase or the zinc rich globules or phases of the two phase coating. The two phase coating is obtained by a continuous hot dipped process on a thin metal strip. By using this process to obtain the two phase characteristics of the invention, the advantages of the two-phase coating can be realized with coating thicknesses of less than about 0.003 inch. Only in this way can the strip be commercially viable.

The two-phase tin-zinc formulation oxidizes to form a colored coating which closely matches the popular grey, earth-tone color of weathered terne. The use of large weight percentages of zinc in the two-phase tin and zinc alloy does not cause the coating to become too rigid or brittle. The tin and zinc alloy coated material can be formed or bent and resists cracking or breaking as revealed by extensive experimentation performed on tin-zinc coatings having a zinc content from 10 to 85 weight percent. Is was found that a two-phase tin-zinc coating containing 10-85 weight percent zinc and essentially the balance tin produced an acceptably malleable coated material. Zinc concentrations of 10 weight percent or greater also stabilizes the tin in the two-phase alloy to resist tin crystallization. The malleability of two-phase tin-zinc alloys containing high concentrations of zinc apparently results from the unique tin and zinc distribution within the two-phase alloy.

In accordance with another embodiment of the present invention, the metal alloy contains small amounts of other metals to modify the physical properties of the metal alloy to contribute to the strength of the metal alloy, to the corrosion-resistance of the metal alloy, to the color of the metal alloy, to the stability of the metal alloy and to the coating properties of the metal alloy. The secondary metals preferably constitute less than 10 weight percent of the metal alloy and more preferably less than 2 weight percent of the metal alloy.

In accordance with another embodiment of the invention, the two phase tin and zinc alloy contains bismuth and antimony. The bismuth contained in the metal alloy ranges from 0.0 to 1.7 weight percent of the alloy and preferably up to about 0.5 weight percent. Antimony is added to the metal alloy in amounts from 0.0 to 2.0 weight percent. The metal alloy preferably contains bismuth and/or antimony since these two metals add to abrasive resistive properties of the metal alloy and prevent the tin in the metal alloy from crystallizing which results in flaking of the metal alloy from the metal strip. Tin begins to crystalize when the temperature drops below 56° F. (13.2° C.). Only small amounts of antimony or bismuth are needed to stabilize the tin and prevent the tin from crystallizing. Amounts of at least 0.005 weight percent have been found to adequately inhibit crystallization of the tin which results in the metal alloy prematurely flaking. Antimony also improves the corrosion-resistance of the metal alloy. The addition of bismuth improves the mechanical properties of the metal alloy such as pliability, hardness and strength of the metal alloy.

In accordance with another embodiment of the invention, a coloring agent is added to the two-phase tin-zinc alloy to affect the color and reflectivity of the coated metal strip. Copper metal has been found to be an effective coloring agent to reduce the reflectiveness of the newly applied metal alloy by dulling the color of the metal alloy coating. The addition of a small amount of copper to the metal alloy also improves the corrosion-resistance of the metal alloy, especially in marine environments and for gasoline tanks. The copper addition to the metal alloy also positively affects other physical properties of the metal alloy such as act as a metallic stabilizer for the metal alloy, increase the pliability of the metal alloy. The copper content is added up to 2.0 weight percent of the metal alloy. Preferably, the copper content of the metal alloy does not exceed 1.6 weight percent. When copper is added to the metal alloy, copper content is added in amounts from 0.005 to 1.6 weight percent and more preferably from 0.1 to 1.5 weight percent. Copper is preferably added to the molten metal alloy in the form of brass.

In accordance with another embodiment of the invention, small amounts of other metals, such as iron, are added to the two-phase tin and zinc alloy coating to strengthen and/or positively affect other physical properties of the metal alloy. When iron is contained in the metal alloy, the iron content preferably does not exceed 1.0 weight percent of the metal alloy.

In accordance with another embodiment of the invention, the two-phase tin and zinc alloy includes nickel. The two-phase tin and zinc alloy which contains nickel has exhibited increased corrosion resistance. The nickel additive in the two-phase metal alloy coating has been found to increase the corrosion-resistance of the two-phase metal alloy coating especially in alcohol and halogen containing environments. The nickel content of the two-phase metal alloy coating preferably does not exceed 2.0 weight percent. Larger nickel concentrations make the coated materials difficult to form. Preferably, the nickel content does not exceed 1.0 weight percent and more preferably 0.3–0.9 weight percent and even more preferably about 0.7 weight percent.

In accordance with another embodiment of the invention, magnesium is added to the two-phase tin and zinc alloy to improve the corrosion-resistance of the alloy. The tin-zinc alloy has anodic characteristics which attract negatively charged components such as oxygen, alcohols and halogens. These negatively charged components eventually react with the two-phase metal alloy which, in turn, causes the two-phase metal alloy to increase the rate of corrosion. It has been found that the addition of magnesium to the two-phase metal alloy reduces the anodic characteristics of the alloy thus increasing the corrosion-resistance of the two-phase metal alloy. The addition of magnesium also improves the flowability or viscous qualities of the molten two-phase metal alloy to improve the ease of applying the two-phase metal alloy and uniformity of the two-phase metal alloy coating. The addition of magnesium to the molten two-phase metal alloy further reduces or eliminates the need of using a flux in melting pot 70. The magnesium content does not exceed 2.0 weight percent of the metal alloy. The magnesium is preferably not more than about 1.0 weight percent of the metal alloy and more preferably 0.1–0.4 weight percent of the metal alloy.

In accordance with another embodiment of the invention, the two-phase tin and zinc alloy contains titanium. Titanium has been found to positively affect the grain refinement of the two-phase to improve the bonding of the two-phase metal alloy to the metal strip. A small grain size of the two-phase tin and zinc alloy has been found to form a stronger bond to the metal strip. Titanium in the metal alloy facilitates in the formation of a smaller grain size of the metal alloy. Titanium has also been found to reduce oxidation of the molten metal alloy and to reduce dross formation. The titanium content of the metal alloy preferably does not exceed 1.0 weight percent of the metal alloy. Preferably, the titanium content of the metal alloy is from 0.01–0.5%, and more preferably 0.01–0.15% of the metal alloy.

In accordance with another embodiment of the invention, aluminum is added to the two-phase tin and zinc alloy. Aluminum has been found to reduce oxidation of the molten two-phase metal alloy and to reduce dross formation. The aluminum also improves the bonding of the metal alloy to the metal strip. The addition of aluminum reduces the formation of a Fe-Zn intermetallic layer when the two-phase alloy is coated on a ferrous metal strip thus improving the formability of ferrous metal coated strip. Aluminum further increases the luster of the coated metal alloy. In order to dull the color and reflectivity of the metal coating containing aluminum, a coloring and dulling agent such as copper should be added to the metal alloy when aluminum is added to the metal alloy. The amount of aluminum added to the metal alloy preferably does not exceed 2.0 weight percent of the metal alloy. Preferably, the aluminum content of the metal alloy is 0.01–1.0 weight percent, more preferably 0.01–0.5 weight percent and even more preferably 0.01–0.3 weight percent.

Figure 3:
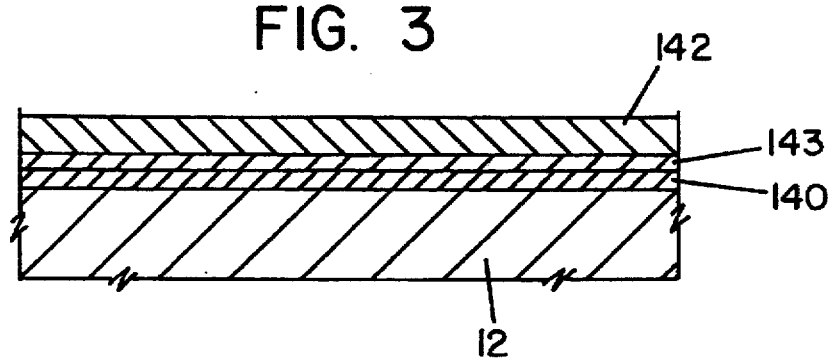
FIG. 3 is a cross-sectional view of a coated metal strip which illustrates the intermetallic layer.

As illustrated in FIG. 3, as the strip passes through melting pot 70, an intermetallic layer 140 is formed which assists in creating a strong bond between strip 12, metal alloy coating 142 and intermediate metal barrier layer 143. The intermetallic layer is formed by metal alloy coating atoms molecularly intertwining with atoms on the surface of strip 12 as the temperature of the metal strip approaches the temperature of the molten metal alloy in the melting pot. The migration of the metal alloy coating 142 and the migration of the metal atoms from intermediate metal barrier layer 143 atoms into the surface layer of strip 12 results in the formation of intermetallic layer 140. The thickness of the intermetallic layer is very thin and varies between 1–10 microns. For the coating of a nickel plated stainless steel strip with a two-phase tin and zinc alloy, intermetallic layer 140 is an alloy primarily of chromium, iron, tin, zinc and nickel, i.e. Cr-Fe-Sn-Zn-Ni. Intermetallic layer 140 can include nickel, zinc, iron, copper, chromium, tin, aluminum, lead, manganese, molybdenum, silicon, cadmium, titanium, magnesium, antimony, bismuth, carbon, boron, vanadium, cadmium, hydrogen, phosphorous, sulfur, nitrogen and/or oxygen and small amounts of other elements or compounds depending on the composition of strip 12, intermediate layer 143 and molten alloy 76. Intermetallic layer 140 can be thought of as a transition layer between strip 12 and metal alloy coating 142. Intermetallic layer 140 is primarily responsible for the strong bonding between metal alloy coating 142 and strip 12. The intermetallic layer also forms a corrosive-resistant layer. The residence time of strip 12 in melting pot 70 is preferably less than three minutes and preferably less than one minute and more preferably 5–30 seconds. The residence time is selected to properly form the intermetallic layer.

Referring now to FIG. 2, strip 12 preferably passes between at least one set of coating rollers 82 prior to exiting melting pot 70. Coating rollers 82 maintain the desired metal alloy coating thickness on strip 12 and remove any excess metal alloy 76 from strip 12. The thickness of the metal alloy coating on each side of strip 12 is preferably maintained between 0.0001 to 0.05 inch and more preferably above 0.0003 inch and even more preferably 0.001–0.003 inch. The coating thickness is selected to ensure that the metal alloy coating has essentially no pin holes, such as created by electroplating, and does not shear when formed into products such as roofing materials, building materials gasoline tanks, filter casings and/or various other products formed from strip metal. The thickness of the metal alloy coating is preferably between 0.001 to 0.003 inch (0.1–1.8 oz/ft$^2$ @ density of 447 lb/ft$^3$). A coating thickness of at least 0.001 inch forms a coating with virtually no pinholes in the coating and resists tearing when the coating strip is drawn or formed, such as into roofing materials or gasoline tanks. Such coating thicknesses essentially eliminates uncovered and unprotected areas on the strip surface commonly found on coated articles with thinner coatings. The coating thickness of at least 0.001 inch allows for greater elongation characteristics of the coated strip as compared to strip having a thin coating and results in the strip maintaining a protective coating throughout the strip surface during and after the metal strip has been drawn by a die. When coating rollers are used, protective material 78 is preferably located near coating rollers 82. The protective material floats on top of molten metal alloy 76 to prevent the molten alloy from solidifying and oxidizing, reduces dross formation and also aids in properly .distribution the metal alloy on strip 12.

In another alternative embodiment, FIG. 2 illustrates a metal coating jet 84 which injects molten metal alloy 76 on the outer surface of coating roller 82. Molten alloy 76 is spray jetted on coating roller 82 are pressed against strip 12 as strip 12 travels between coating roller 82 to fill in any small surface areas on strip 12 which have not been coated by the molten alloy in melting pot 70. Preferably two coating jets are used.

Figure 2A:
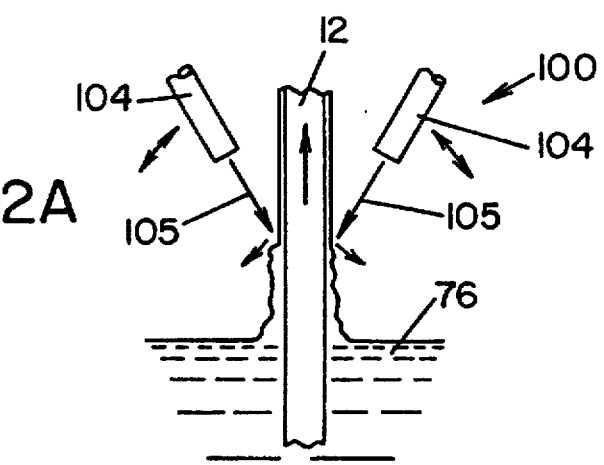
FIG. 2a illustrates a cross-sectional view of an alternative embodiment wherein air-knifes are used during the hot-dip coating of the metal strip.

In still another alternative embodiment, FIG. 2a illustrates an air-knife 100 which directs a high velocity gas toward metal alloy coating 76 on strip 12. Two or more blast nozzles 104 which are mutually opposed from each other and disposed over melting pot 70 direct high velocity gas 105 toward coated strip 12 and down into melting pot 70 as the strip continuously travels between the blast nozzles. The high velocity gas removes surplus molten metal alloy coating from the strip, smears the molten alloy on strip 12 to cover any pin holes, reduces the thickness of the metal alloy coating on said strip and reduce lumps or ribs in the metal alloy coating. The high velocity gas is preferably an inert gas so as not to induce oxidation of the molten metal alloy. Use of an inert gas also reduces dross formation on the metal alloy coating and acts as a protective barrier to air which causes viscous oxides to form on the surface of the molten metal alloy in melting pot 70. When inert gas is used, the use of a protective material on the melting pot is not required. Preferably the inert gas is nitrogen or an inert gas heavier (higher density) than air. The blast nozzles are preferably adjustable to direct the high velocity gas at various angles to the surface of the coated alloy to vary the amount of coating shaved off the strip. Though not shown, the blast nozzles are preferably enclosed in a box shaped sleeve which contains the inert gas after the gas contacts the strip and recirculates the inert gas back through the blast nozzles. When an air-knife is used, the air-knife is preferably used as a substitute for or in conjunction with coating rollers 82.

In an alternative embodiment, strip 12 is subjected to leveler 101 after exiting melting pot 70 as illustrated in FIG. 1b. Leveler 101 includes several level rollers 102 which produce a uniform and smooth metal alloy coating 142 on strip 12. After strip 12 exits leveler 101, strip 12 is preferably cut by shear 111 into the desired strip lengths or rolled in strip roll 150.

In an alternative embodiment, strip 12 is coated with a pre-weather agent 112 as illustrated in FIG. 1b. The metal alloy coated strip 12 or cut sheets 130 are pre-weather coated by pre-weather coaters 114 which apply a pre-weather agent 112. Pre-weather agent 112 includes an asphalt-base paint which is applied at a thickness of approximately 1–2 mils (0.001–0.002 inch). Preferably, coated sheets 130 or metal strip 12 are coated with a pre-weather agent 112 on both sides. The pre-weather coaters 114 have the pre-weather agent 112 applied either by pre-weather sprayer 116 and/or by rotating coaters 114 in pre-weather reservoir 110. The pre-weather agent 112 is rapidly dried by heat lamp 120 and/or by a dryer 122. The coated metal strip 12 or cut sheets 130 is rolled in strip roll 150, stacked in sheets for transport, or pre-formed into roofing materials, building materials, gas tanks, filters, etc.

The general formulation of the invention is as follows:

| | |
|---|---|
| Tin | 15–90 |
| Zinc | 10–85 |
| Magnesium | 0.0–2.0 |
| Nickel | 0.0–2.0 |
| Copper | 0.0–2.0 |
| Titanium | 0.0–1.0 |
| Aluminum | 0.0–2.0 |
| Antimony | 0.0–2.0 |
| Bismuth | 0.0–1.7 |
| Iron | 0.0–1.0 |
| Lead | 0.0–0.5 |

A few examples of the tin-zinc, two-phase metallic coating which have exhibited the desired characteristics as mentioned above are set forth as follows:

| Alloy Ingredients | A | B | C | D | E | F |
|---|---|---|---|---|---|---|
| Tin | 15 | 20 | 25 | 30 | 35 | 40 |
| Magnesium | <1.0 | <1.0 | <1.0 | <1.0 | <1.0 | 40 |
| Nickel | ≤1.0 | ≤1.0 | ≤1.0 | ≤1.0 | ≤1.0 | 40 |
| Copper | ≤2.0 | ≤2.0 | ≤2.0 | ≤2.0 | ≤2.0 | 40 |
| Titanium | <0.5 | <0.5 | <0.5 | <0.5 | <0.5 | 40 |
| Aluminum | <1.0 | <1.0 | <1.0 | <1.0 | <1.0 | 40 |
| Antimony | ≤2.0 | ≤2.0 | ≤2.0 | ≤2.0 | ≤2.0 | 40 |
| Bismuth | ≤1.7 | ≤1.7 | ≤1.7 | ≤1.7 | ≤1.7 | 40 |
| Iron | ≤1.0 | ≤1.0 | ≤1.0 | ≤1.0 | ≤1.0 | 40 |
| Lead | <0.5 | <0.5 | <0.5 | <0.5 | <0.5 | 40 |
| Zinc | ≤80 | ≤80 | ≤75 | ≤70 | ≤65 | 40 |

| Alloy Ingredients | F | G | H | I | J |
|---|---|---|---|---|---|
| Tin | 45 | 50 | 55 | 60 | 65 |
| Magnesium | <1.0 | <1.0 | <1.0 | <1.0 | <1.0 |
| Nickel | ≤1.0 | ≤1.0 | ≤1.0 | ≤1.0 | ≤1.0 |
| Copper | ≤2.0 | ≤2.0 | ≤2.0 | ≤2.0 | ≤2.0 |
| Titanium | <0.5 | <0.5 | <0.5 | <0.5 | <0.5 |
| Aluminum | <1.0 | <1.0 | <1.0 | <1.0 | <1.0 |
| Antimony | ≤2.0 | ≤2.0 | ≤2.0 | ≤2.0 | ≤2.0 |
| Bismuth | ≤1.7 | ≤1.7 | ≤1.7 | ≤1.7 | ≤1.7 |
| Iron | ≤1.0 | ≤1.0 | ≤1.0 | ≤1.0 | ≤1.0 |
| Lead | <0.5 | <0.5 | <0.5 | <0.5 | <0.5 |
| Zinc | ≤55 | ≤50 | ≤45 | ≤40 | ≤35 |

| Alloy Ingredients | K | L | M |
|---|---|---|---|
| Tin | 70 | 75 | 85 |
| Magnesium | <1.0 | <1.0 | <1.0 |
| Nickel | ≤1.0 | ≤1.0 | ≤1.0 |
| Copper | ≤2.0 | ≤2.0 | ≤2.0 |
| Titanium | <0.5 | <0.5 | <0.5 |
| Aluminum | <1.0 | <1.0 | <1.0 |

| | | | |
|---|---|---|---|
| Antimony | ≦2.0 | ≦2.0 | ≦2.0 |
| Bismuth | ≦1.7 | ≦1.7 | ≦1.7 |
| Iron | ≦1.0 | ≦1.0 | ≦1.0 |
| Lead | <0.5 | <0.5 | <0.5 |
| Zinc | ≦30 | ≦25 | ≦15 |

Typically, the formulations of the tin-zinc metallic coating includes: 10–80% zinc; 20–90% tin; 0.0–0.4% magnesium; 0.0–0.1% manganese; 0.0–1.0% nickel; 0.0–2.0% copper; 0.0–0.15% titanium; 0.0–0.5% aluminum; 0.0–2.0 antimony; 0.0–1.5% bismuth; up to 1.0% iron, 0.0–0.5% silicon, 0.0–0.1% cadmium, 0.0–0.01% boron, 0.0–0.5% carbon, 0.0–0.5% chromium, 0.0–0.1% molybdenum, 0.0–0.1% vanadium, and less than 0.5% lead. Preferably, the tin-zinc coating formulations are 35–80% zinc; 20–65% tin; 0.0–0.4% magnesium; 0.0–0.1% manganese; 0.0–0.7% nickel; 0.0–1.0% copper; 0.0–0.15% titanium; 0.0–0.3% aluminum; 0.0–1.0% bismuth and/or antimony; less than 0.6% iron; less than 0.5% lead; and the tin plus zinc content is at least 95% of the coating. More preferably, the tin-zinc coating formulations are 50–80% zinc; 20–50% tin; 0.0–0.1% magnesium; 0.0–0.05% manganese; 0.0–0.1% nickel; 0.0–0.2% copper; 0.00–0.15% titanium; 0.0–0.3% aluminum; 0.005–0.5% antimony and/or bismuth; 0.0–0.6 iron; 0.0–0.4% lead; 0.0–0.1% silicon; 0.0–0.05% cadmium and the tin plus zinc content is at least 95% more preferably 98% of the coating.

EXAMPLE A

A carbon steel strip is unwound from a roll of carbon steel strip. The carbon steel strip has a thickness of less than 0.03 inch. The strip is continuously passed through an electrolytic tank to plate nickel on the strip surface. The nickel plated layer has a thickness of 1–3 microns. The metal alloy includes 95–98% tin and zinc and less than 0.5% lead. The metal is in a melting pot at a temperature of 575°–850° F. The strip is passed through the melting pot having a length of about 16 feet at a speed of about 100 ft/min and has a resident time in the melting pot of less than 10 seconds. The coated strip is passed through coating rollers and/or an air-knife to achieve a coating thickness of 0.0003–0.003 inch. The coated strip is rewound into a roll of coated strip.

EXAMPLE B

A carbon steel strip is unwound from a roll of carbon steel strip. The carbon steel strip has a thickness of less than 0.03 inch. The carbon steel strip is plated with chromium of a thickness of less than 3 microns. The metal alloy is 95–98% tin and zinc and less than 2.0% of a metal additive and less than 0.5% lead. The metal alloy is heated in a melting pot at a temperature of 575°–900° F. The strip is passed through the melting pot having a length of about 16 feet at a speed of about 100 ft/min and has a resident time in the melting pot of less than 10 seconds. The coated strip is passed through coating rollers and/or an air-knife to achieve a coating thickness of 0.0003–0.003 inch. The coated strip is rewound into a roll of coated strip.

EXAMPLE C

A copper strip is unwound from a roll of copper strip. The copper strip has a thickness of less than 0.03 inch. The copper strip is continuously plated with a tin layer of 1–3 microns thick. The metal alloy is 90–99% tin and zinc. The metal alloy is heated in a melting pot at a temperature of 575°–900° F. The strip is passed through the melting pot having a length of about 16 feet at a speed of about 100 ft/min and has a resident time in the melting pot of less than 10 seconds. The coated strip is passed through coating rollers and/or an air-knife to achieve a coating thickness of 0.0003–0.003 inch. The coated strip is rewound into a roll of coated strip.

EXAMPLE D

A carbon steel strip is unwound from a roll of carbon steel strip and continuously plated with a tin layer of a thickness of less than 3 microns. The carbon steel strip has a thickness of less than 0.03 inch. The metal alloy is 90–99% tin and zinc and less than 0.5% lead. The metal alloy is heated in a melting pot at a temperature of 575°–800° F. The strip is passed through the melting pot having a length of about 16 feet at a speed of about 100 ft/min and has a resident time in the melting pot of less than 10 seconds. The coated strip is passed through coating rollers and/or an air-knife to achieve a coating thickness of 0.0003–0.003 inch. The coated strip is rewound into a roll of coated strip.

EXAMPLE E

A stainless steel strip is unwound from a roll of stainless steel strip. The stainless steel strip is continuously plated with a tin layer of 1–3 microns thick. The stainless steel strip has a thickness of less than 0.03 inch. The metal alloy is 90–99% tin and zinc and is heated in a melting pot at a temperature of 575°–800° F. The strip is passed through the melting pot having a length of about 16 feet at a speed of about 100 ft/min and has a resident time in the melting pot of less than 10 seconds. The coated strip is passed through coating rollers and/or an air-knife to achieve a coating thickness of 0.0003–0.003 inch. The coated strip is rewound into a roll of coated strip.

EXAMPLE F

A carbon steel strip is unwound from a roll of carbon steel strip and is pickled with a hydrochloric acid solution and a copper sulfate solution. Copper was plated onto the strip surface during pickling to form a copper layer of 1–3 microns thick. The carbon steel strip has a thickness of less than 0.03 inch. The metal alloy includes 90–95% tin and zinc and less than 0.5% lead. The metal is in a melting pot at a temperature of 575°–900° F. The strip is passed through the melting pot having a length of about 16 feet at a speed of about 100 ft/min and has a resident time in the melting pot of less than 10 seconds. The coated strip is passed through coating rollers and/or an air-knife to achieve a coating thickness of 0.0003–0.003 inch. The coated strip is rewound into a roll of coated strip.

The thickness of the two-phase tin and zinc alloy is varied depending on the environment in which the treated roofing system is used. The two-phase alloy exhibits superior corrosive resistant properties in rural environments, industrial and marine environments. The metal alloy coating is preferably applied in a thickness between 0.0001–0.05 inch. Preferably, the metal alloy coating thickness is at least 0.0003 inch and more preferably 0.001–0.003 inch. Such a metal alloy coating thickness has been found to be adequate to prevent and/or significantly reduce the corrosion of the metal strip in virtually all types of environments. Metal alloy coatings having thicknesses greater than 0.003 inch can be used in harsh environments to provide added corrosion protection.

The metal alloy is designed to be used in all types of metal strip applications. The metal alloy strip can be used for standing seam and press fit (mechanical joining, see assignee's U.S. Pat. No. 4,987,716 patent) applications for roofing. In standing seam applications, the edges of the roofing materials are folded together and then soldered to form a water tight seal. The metal alloy inherently includes excellent soldering characteristics. When the metal alloy is heated, it has the necessary wetting properties to produce a tight water resistant seal. As a result, the metal alloy acts as both a corrosive resistive coating and a soldering agent for standing seam roofing systems. The metal alloy coated can be also welded with standard solders. Typical solders contain about 50% tin and 50% lead. The metal alloy has the added advantage of also being able to be soldered with low or no-lead solders. The metal alloy coated roofing materials also can be used in mechanically joined roofing systems due to the malleability of the metal alloy. Mechanically joined systems form water tight seals by folding adjacent roof material edges together and subsequently applying a compressive force to the seam in excess of 1,000 psi. Under these high pressures, the metal alloy plastically deforms within the seam and produces a water tight seal.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus described the invention the following is claimed:

1. A method of producing a coated metal strip having corrosion-resistant properties comprising the steps of:
   (a) providing a metal strip; and,
   (b) coating said metal strip with a corrosion-resistant alloy by passing said metal strip through a molten bath of said corrosion-resistant alloy such that the residence time of said metal strip in said molten bath is sufficient to deposit a layer of said alloy on the surface of said metal strip, said corrosion-resistant alloy comprising tin, zinc and a metal additive and the tin content plus the zinc content constituting a majority of said corrosion-resistant alloy, said zinc content at least about 10 weight percent of said corrosion-resistant alloy, said tin content at least about 15 weight percent of said corrosion-resistant alloy, and said metal additive selected from the group consisting of a stabilizer agent for inhibiting crystallization of said tin, a coloring agent for reducing the reflectivity of said corrosion-resistant alloy coating, a corrosion-resistant agent for enhancing the corrosion-resistant properties of said corrosion-resistant alloy coating and mixtures thereof.

2. A method as defined in claim 1, wherein said stabilizing agent includes at least an effective amount of metal selected from the group consistent of antimony, bismuth, copper and mixtures thereof.

3. A method as defined in claim 2, wherein said corrosion-resistant agent includes at least an effective amount of metal selected from the group consisting of antimony, bismuth, copper, magnesium, nickel, titanium and mixtures thereof.

4. A method as defined in claim 1, wherein said corrosion-resistant agent includes at least an effective amount of metal selected from the group consisting of antimony, bismuth, copper, magnesium, nickel, titanium and mixtures thereof.

5. A method as defined in claim 1, wherein said corrosion-resistant alloy includes said coloring agent, said coloring agent including at least an effective amount of copper.

6. A method as defined in claim 1, wherein said corrosion-resistant alloy includes said coloring agent, said coloring agent including at least an effective amount of copper.

7. A method as defined in claim 1, wherein said corrosion-resistant alloy includes said coloring agent, said coloring agent including at least an effective amount of copper.

8. A method as defined in claim 1, wherein said corrosion-resistant alloy includes said coloring agent, said coloring agent including at least an effective amount of copper.

9. The method as defined in claim 1, wherein the weight percentage of said tin content plus said zinc content of said corrosion-resistant alloy is at least about 80 weight percent.

10. The method as defined in claim 9, wherein the weight percentage of said tin content plus said zinc content of said corrosion-resistant alloy is at least about 90 weight percent.

11. A method as defined in claim 1, wherein said corrosion-resistant alloy includes up to about two weight percent of a additional additive selected from the group consisting of aluminum, manganese, silicon, cadmium, lead, iron, boron, carbon, chromium, molybdenum, vanadium and mixtures thereof.

12. The method as defined in claim 1, wherein said metallic alloy is a two-phase alloy of tin and zinc comprising:

| | |
|---|---|
| Tin | 15–90% |
| Zinc | 10–85% |
| Magnesium | 0.0–2% |
| Nickel | 0.0–2% |
| Copper | 0.0–2% |
| Titanium | 0.0–1% |
| Aluminum | 0.0–2% |
| Antimony | 0.0–2% |
| Bismuth | 0.0–1.7% |
| Iron | 0.0–1% |
| Lead | 0.0–0.5%. |

13. A method as defined in claim 1, including the step of controlling the thickness of said corrosion-resistant coating on each side of said metal strip to about 0.0001 to about 0.05 inch as said metal strip exits said molten bath.

14. The method as defined in claim 13, wherein thickness of said coating is about 0.001 to about 0.003 inch.

15. The method as defined in claim 1, wherein said residence time is about 0.08 to about 10 minutes.

16. The method as defined in claim 15, wherein said residence time is less than about one minute.

17. The method as defined in claim 1, including the step of applying an intermediate metal layer to the surface of said metal strip prior to passing said metal strip through said molten bath of said corrosion-resistance alloy.

18. The method as defined in claim 17, wherein said intermediate metal layer is selected from the group consisting of tin, chromium, nickel and copper.

19. The method as defined in claim 1, wherein said metal strip is a metal selected from the group consisting of carbon steel, stainless steel, copper, nickel alloys, tin, titanium and bronze.

20. The method as defined in claim 1, wherein the thickness of said metal strip is about 0.005 to about 0.1 inch.

21. The method as defined in claim 1, including the step of pre-heating said metal strip prior to passing said metal strip through said molten bath.

22. The method as defined in claim 1, including the step of pre-treating said metal strip to substantially remove oxides from the surface of said metal strip prior to passing said metal strip through said molten bath.

23. A method as defined in claim 1, wherein said corrosion-resistant alloy comprises:

| | |
|---|---|
| Tin | ≧20% |
| Zinc | ≦80%. |

24. A method as defined in claim 1, wherein said corrosion-resistant alloy comprises:

| | |
|---|---|
| Tin | ≧25% |
| Zinc | ≦75%. |

25. A method as defined in claim 1, wherein said corrosion-resistant alloy comprises:

| | |
|---|---|
| Tin | ≧30% |
| Zinc | ≦70%. |

26. A method as defined in claim 1, wherein said corrosion-resistant alloy comprises:

| | |
|---|---|
| Tin | ≧35% |
| Zinc | ≦65%. |

27. A method as defined in claim 1, wherein said corrosion-resistant alloy comprises:

| | |
|---|---|
| Tin | ≧40% |
| Zinc | ≦60%. |

28. A method as defined in claim 1, wherein said corrosion-resistant alloy comprises:

| | |
|---|---|
| Tin | ≧45% |
| Zinc | ≦55%. |

29. A method as defined in claim 1, wherein said corrosion-resistant alloy comprises:

| | |
|---|---|
| Tin | ≧50% |
| Zinc | ≦50%. |

30. A method as defined in claim 1, wherein said corrosion-resistant alloy comprises:

| | |
|---|---|
| Tin | ≧55% |
| Zinc | ≦45%. |

31. A method as defined in claim 1, wherein said corrosion-resistant alloy comprises:

| | |
|---|---|
| Tin | ≧60% |
| Zinc | ≦40%. |

32. A method as defined in claim 1, wherein said corrosion-resistant alloy comprises:

| | |
|---|---|
| Tin | ≧65% |
| Zinc | ≦35%. |

33. A method as defined in claim 1, wherein said corrosion-resistant alloy comprises:

| | |
|---|---|
| Tin | ≧70% |
| Zinc | ≦30%. |

34. A method as defined in claim 1, wherein said corrosion-resistant alloy comprises:

| | |
|---|---|
| Tin | ≧75% |
| Zinc | ≦25%. |

35. A method as defined in claim 1, wherein said corrosion-resistant alloy comprises:

| | |
|---|---|
| Tin | ≧80% |
| Zinc | ≦20%. |

36. A method as defined in claim 1, wherein said corrosion-resistant alloy comprises:

| | |
|---|---|
| Tin | ≧85% |
| Zinc | ≦15%. |

37. A method as defined in claim 1, wherein said corrosion-resistant alloy comprises:

| | |
|---|---|
| Tin | 20–90% |
| Zinc | 10–80% |
| Aluminum | 0.0–0.5% |
| Antimony | 0.0–2% |
| Boron | 0.0–0.01% |
| Bismuth | 0.0–1.5% |
| Cadmium | 0.0–0.1% |
| Carbon | 0.0–0.5% |
| Chromium | 0.0–0.5% |
| Copper | 0.0–2% |
| Iron | 0.0–1% |
| Lead | 0.0–0.5% |
| Magnesium | 0.0–0.4% |
| Manganese | 0.0–0.1% |
| Molybdenum | 0.0–0.1% |
| Nickel | 0.0–1% |
| Silicon | 0.0–0.5% |
| Titanium | 0.0–0.15% |
| Vanadium | 0.0–0.1%. |

38. A method as defined in claim 1, wherein said corrosion-resistant alloy comprises:

| | |
|---|---|
| Tin | 20–65% |
| Zinc | 35–80% |
| Aluminum | 0.0–0.3% |
| Antimony and/or Bismuth | 0.0–1% |
| Copper | 0.0–1% |
| Iron | 0.0–0.6% |
| Lead | 0.0–0.5% |
| Magnesium | 0.0–0.4% |
| Manganese | 0.0–0.1% |
| Nickel | 0.0–0.7% |
| Titanium | 0.0–0.15% | and said tin content plus said zinc content is at least about 95 weight percent.

39. A method as defined in claim 1, wherein said corrosion-resistant alloy comprises:

| | |
|---|---|
| Tin | 20–50% |
| Zinc | 50–80% |
| Aluminum | 0.0–0.3% |
| Antimony and/or Bismuth | 0.005–0.5% |
| Cadmium | 0.0–0.05% |
| Copper | 0.0–0.2% |
| Iron | 0.0–0.6% |
| Lead | 0.0–0.4% |
| Magnesium | 0.0–0.1% |
| Manganese | 0.0–0.05% |
| Nickel | 0.0–0.1% |
| Silicon | 0.0–0.1% |
| Titanium | 0.0–0.15% | said tin content plus said zinc content at least about 98 weight percent.

40. A method of producing a coated metal strip having corrosion-resistant properties comprising the steps of:

(a) providing a metal strip from a roll of metal strip;

(b) unrolling said metal strip from said roll;

(c) applying an intermediate metal layer to the surface of said metal strip; and, (d) coating said metal strip with a corrosion-resistant alloy by passing said strip through a molten bath of said corrosion-resistant alloy such that the residence time of said strip in said molten alloy is sufficient to deposit a layer of said alloy on the surface of said strip, said corrosion-resistant alloy comprising tin, zinc and a metal additive and the tin content plus the zinc content constituting a majority of said corrosion-resistant alloy, said zinc content at least about 10 weight percent of said corrosion-resistant alloy, said tin content at least 15 weight percent of said corrosion-resistant alloy, and said metal additive selected from the group consisting of a stabilizing agent for inhibiting crystallization of said tin, a coloring agent for reducing the reflectivity of said corrosion-resistant alloy, a corrosion-resistant agent for enhancing the corrosion-resistant properties of said corrosion-resistant alloy and mixtures thereof, said stabilizing agent including at least an effective amount of metal selected from the group consistent of antimony, bismuth, copper and mixtures thereof.

41. A method as defined in claim 40, wherein said corrosion-resistant agent includes at least an effective amount of metal selected from the group consisting of antimony, bismuth, copper, magnesium, nickel, titanium and mixtures thereof.

42. A method as defined in claim 41, wherein said coloring agent includes at least an effective amount of copper.

43. A method as defined in claim 40, wherein said coloring agent includes at least an effective amount of copper.

44. The method as defined in claim 40, wherein the weight percentage of said tin content plus the zinc content of said corrosion-resistant alloy is at least about 80 weight percent.

45. The method as defined in claim 41, wherein said corrosion-resistant alloy comprises:

| | |
|---|---|
| Tin | 15–90% |
| Zinc | 10–85% |
| Magnesium | 0.0–2% |
| Nickel | 0.0–2% |
| Copper | 0.0–2% |
| Titanium | 0.0–1% |

-continued

| | |
|---|---|
| Aluminum | 0.0–2% |
| Antimony | 0.0–2% |
| Bismuth | 0.0–1.7% |
| Iron | 0.0–1% |
| Lead | 0.0–0.5%. |

46. The method as defined in claim 40, wherein said intermediate metal layer is selected from the group consisting of tin, chromium, nickel and copper.

47. The method as defined in claim 40, wherein said metal strip is a metal selected from the group consisting of carbon steel, stainless steel, copper, nickel alloys, tin, titanium and bronze.

48. A method of producing a coated metal strip with a corrosive-resistant alloy comprising the steps of:

a) selecting a metal strip formed of a given metal and having an exposed surface and a thickness of less than about 0.20 inch;

b) unrolling said metal strip from a coil of said metal strip;

c) hot dip coating said metal strip with a corrosive-resistant coating by continuously passing said metal strip in a longitudinal direction at a speed through a molten bath of said corrosion-resistant alloy, said molten bath having a temperature of at least about 449° F., said metal strip having a residence time in said molten bath of about 0.08 to about 10 minutes to deposit a substantially uninterrupted layer of said corrosion-resistant alloy, said layer of corrosion-resistant alloy having a substantially uniform thickness of at least about 0.0001 inch on each side of the exposed surface of said metal strip, said passing of said metal strip through said molten bath forming an intermetallic interface comprising an interface alloy constituting a heat created mixture of said given metal and said corrosion-resistant alloy and having a thickness of about 1 to about 10 microns, said corrosion-resistant alloy comprising at least about 15 weight percent tin, at least about 10 weight percent zinc and a metal additive, said tin content plus said zinc content at least about 80 weight percent, said metal additive selected from the group consisting of a stabilizing agent for inhibiting crystallization of said tin, a coloring agent for reducing the reflectivity of said corrosion-resistant alloy coating, a corrosion-resistant agent for enhancing the corrosion-resistant properties of said corrosion-resistant alloy coating and mixtures thereof, said stabilizing agent including at least an effective amount of metal selected from the group consisting of antimony, bismuth, copper and mixtures thereof, said corrosion-resistant agent including at least an effective amount of a metal selected from the group consisting of antimony, bismuth, copper, magnesium, nickel, titanium and mixtures thereof, and said coloring agent including at least an effective amount of copper.

49. The method as defined in claim 48, including the step of pre-treating said exposed surface of said metal strip to substantially remove oxides from said exposed surface.

50. The method as defined in claim 48, wherein said alloy comprises:

| | |
|---|---|
| Tin | 15–90% |
| Zinc | 10–85% |
| Aluminum | 0.0–2% |
| Antimony | 0.0–2% |

-continued

| | |
|---|---|
| Bismuth | 0.0–1.7% |
| Copper | 0.0–2% |
| Lead | 0.0–0.5% |
| Iron | 0.0–1% |
| Magnesium | 0.0–2% |
| Nickel | 0.0–2% |
| Titanium | 0.0–1%. |

51. The method as defined in claim 48, including the step of applying an intermediate metal layer to said exposed surface of said metal strip prior to passing said metal strip through said molten bath.

52. The method as defined in claim 51, wherein said intermediate metal layer is selected from the group consisting of tin, chromium, nickel or copper.

53. A method as defined in claim 48, wherein said corrosion-resistant alloy comprises:

| | |
|---|---|
| Tin | 20–90% |
| Zinc | 10–80% |
| Aluminum | 0.0–0.5% |
| Antimony | 0.0–2% |
| Boron | 0.0–0.01% |
| Bismuth | 0.0–1.5% |
| Cadmium | 0.0–0.1% |
| Carbon | 0.0–0.5% |
| Chromium | 0.0–0.5% |
| Copper | 0.0–2% |
| Iron | 0.0–1% |
| Lead | 0.0–0.5% |
| Magnesium | 0.0–0.4% |
| Manganese | 0.0–0.1% |
| Molybdenum | 0.0–0.1% |
| Nickel | 0.0–1% |
| Silicon | 0.0–0.5% |
| Titanium | 0.0–0.15% |
| Vanadium | 0.0–0.1%. |

54. A method as defined in claim 48, wherein said corrosion-resistant alloy comprises:

| | |
|---|---|
| Tin | 20–65% |
| Zinc | 35–80% |
| Aluminum | 0.0–0.3% |
| Antimony and/or Bismuth | 0.0–1% |
| Copper | 0.0–1% |
| Iron | 0.0–0.6% |
| Lead | 0.0–0.5% |
| Magnesium | 0.0–0.4% |
| Manganese | 0.0–0.1% |
| Nickel | 0.0–0.7% |
| Titanium | 0.0 0.15% | and said tin content plus said zinc content is at least about 95 weight percent.

55. A method as defined in claim 48, wherein said coating comprises:

| | |
|---|---|
| Tin | 20–50% |
| Zinc | 50–80% |
| Aluminum | 0.0–0.3% |
| Antimony and/or Bismuth | 0.005–0.5% |
| Cadmium | 0.0–0.05% |
| Copper | 0.0–0.2% |
| Iron | 0.0–0.6% |
| Lead | 0.0–0.4% |
| Magnesium | 0.0–0.1% |
| Manganese | 0.0–0.05% |
| Nickel | 0.0–0.1% |
| Silicon | 0.0–0.1% |
| Titanium | 0.0–0.15% | and said tin content plus said zinc content at least about 98 weight percent.

56. The method as defined in claim 48, wherein said corrosion-resistant alloy comprises about 0.005 to about 1.6 weight percent copper.

57. The method as defined in claim 56, wherein said corrosion-resistant alloy comprises about 1.0 to about 1.5 weight percent copper.

58. The method as defined in claim 48, wherein said corrosion-resistant alloy comprises about 0.3 to about 1.0 weight percent nickel.

59. The method as defined in claim 58, wherein said corrosion-resistant alloy comprises about 0.7 weight percent nickel.

60. The method as defined in claim 48, wherein said corrosion-resistant alloy comprises about 0.1 to about 1.0 weight percent magnesium.

61. The method as defined in claim 60, wherein said corrosion-resistant alloy comprises about 0.1 to about 0.4 weight percent magnesium.

62. The method as defined in claim 48, wherein said corrosion-resistant alloy comprises about 0.01 to about 1.0 weight percent titanium.

63. The method as defined in claim 62, wherein said corrosion-resistant alloy comprises about 0.01 to about 0.5 weight percent titanium.

64. The method as defined in claim 63, wherein said corrosion-resistant alloy comprises about 0.01 to about 0.15 weight percent titanium.

65. The method as defined in claim 48, wherein said corrosion-resistant alloy comprises about 0.01 to about 1.0 weight percent aluminum.

66. The method as defined in claim 48, wherein said corrosion-resistant alloy comprises about 0.01 to about 0.5 weight percent aluminum.

67. The method as defined in 66, wherein said corrosion-resistant alloy comprises 0.01 to about 0.3 weight percent aluminum.

68. The method as defined in claim 48, wherein said given metal is a metal selected from the group consisting of carbon steel, stainless steel, copper, nickel alloys, tin, titanium and bronze.

69. The method as defined in claim 68, wherein said given material is stainless steel.

70. The method as defined in claim 68, wherein said given material includes copper.

* * * * *

UNITED STATES PATENT AND TRADEMARK OFFICE
CERTIFICATE OF CORRECTION

PATENT NO. : 5,695,822
DATED : December 9, 1997
INVENTOR(S) : Jay F. Carey, II, et. al.

It is certified that error appears in the above-identified patent and that said Letters Patent is hereby corrected as shown below:

Title page, item [*] Notice, should read as following:
The term of this patent shall not extend beyond the expiration date of pat. No. 5,314,758.

Signed and Sealed this

Sixth Day of April, 1999

Attest:

Q. TODD DICKINSON

Attesting Officer

Acting Commissioner of Patents and Trademarks

Disclaimer 5,695,822—Jay F. Carey, II, Follansbee, W. Va.; Mehrooz Zamanzadeh, Pittsburgh, Pa. METHOD FOR COATING A METAL STRIP. Patent dated December 9, 1997. Disclaimer filed May 31, 2002 by the assignee, The Louis Berkman Company.

The term of this patent shall not extend beyond the expiration date of Pat. Nos. 5,354,624; 5,395,703; 5,455,122; 5,470,667; 5,480,731; 5,492,772; 5,520,964; 5,616,424; and 5,667,849.
*(Official Gazette, August 13, 2002)*